United States Patent
Kadiri et al.

(10) Patent No.: US 11,109,438 B2
(45) Date of Patent: Aug. 31, 2021

(54) METHODS TO OPTIMIZE SCELL CONFIGURATION AND ACTIVATION THROUGH UE IDLE MODE SCELL MEASUREMENTS AND QUICK REPORTING

(71) Applicant: QUALCOMM Incorporated, San Diego, CA (US)

(72) Inventors: Prasad Kadiri, San Diego, CA (US); Umesh Phuyal, San Diego, CA (US); Masato Kitazoe, Hachiouji (JP); Srinivasan Balasubramanian, San Diego, CA (US); Arvind Santhanam, San Diego, CA (US); Aziz Gholmieh, Del Mar, CA (US); Arnaud Meylan, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/018,475

(22) Filed: Jun. 26, 2018

(65) Prior Publication Data
US 2019/0037634 A1     Jan. 31, 2019

Related U.S. Application Data

(60) Provisional application No. 62/538,596, filed on Jul. 28, 2017, provisional application No. 62/541,436, filed on Aug. 4, 2017.

(51) Int. Cl.
*H04W 4/00*     (2018.01)
*H04W 76/27*     (2018.01)
(Continued)

(52) U.S. Cl.
CPC ........... *H04W 76/27* (2018.02); *H04W 12/00* (2013.01); *H04W 24/10* (2013.01);
(Continued)

(58) Field of Classification Search
CPC ..... H04W 76/27; H04W 76/15; H04W 76/18; H04W 76/14; H04W 24/10; H04W 74/0833
See application file for complete search history.

(56) References Cited

U.S. PATENT DOCUMENTS 8,526,948 B2 *   9/2013   Uchiyama ......... H04W 36/0088
                                                                                370/216
10,111,265 B2 *   10/2018   Kim ...................... H04W 24/10
(Continued)

OTHER PUBLICATIONS

3GPP TS 36.331 version 14.2.2, May 2017, Evolved universal radio access (E-UTRAN); Radio resource control (RRC), Protocol specification (Year: 2017).*

(Continued)

*Primary Examiner* — Maharishi V Khirodhar
(74) *Attorney, Agent, or Firm* — Terry Tsai

(57) ABSTRACT

In an aspect, while a mobile device is operating in a RRC_Idle State, an RRC_Suspended State, an RLF State and/or an RLF Recovery Procedure State, the mobile device may transmit a connection establishment message to a base station of a plurality of base stations. In an aspect, the connection establishment message includes information that indicates whether the mobile device has information associated with signals transmitted by one or more base stations of the plurality of base stations. The mobile device may initiate transmission of the information associated with the signals to the base station subsequent to establishing a security context for the connection between the mobile device and the base station. In some aspects, the mobile device may scramble the information associated with signals and transmit the information associated with signals to the base station prior to establishing a security context for a connection between the mobile device and the base station.

56 Claims, 8 Drawing Sheets

(51) Int. Cl.
- *H04W 24/10* (2009.01)
- *H04W 12/00* (2021.01)
- *H04W 76/15* (2018.01)
- *H04W 76/18* (2018.01)
- *H04W 74/08* (2009.01)
- *H04W 76/19* (2018.01)
- *H04W 76/14* (2018.01)

(52) U.S. Cl.
CPC ....... H04W 74/0833 (2013.01); H04W 76/15 (2018.02); H04W 76/18 (2018.02); *H04W 76/14* (2018.02); *H04W 76/19* (2018.02)

(56) References Cited

U.S. PATENT DOCUMENTS

| | | | |
|---|---|---|---|
| 2010/0190488 A1* | 7/2010 | Jung | H04W 24/10 455/424 |
| 2011/0201279 A1* | 8/2011 | Suzuki | H04W 24/10 455/67.11 |
| 2014/0023032 A1* | 1/2014 | Kim | H04W 74/0833 370/329 |
| 2014/0056243 A1* | 2/2014 | Pelletier | H04W 74/04 370/329 |
| 2015/0334551 A1* | 11/2015 | Aminaka | H04W 76/15 370/252 |
| 2019/0014492 A1* | 1/2019 | Kim | H04W 24/10 |

OTHER PUBLICATIONS

U.S. Appl. No. 62/529,477, filed 2017.*
"3rd Generation Partnership Project, Technical Specification Group Radio Access Network, Evolved Universal Terrestrial Radio Access (E-UTRA), Radio Resource Control (RRC), Protocol specification (Release 14)", 3GPP Standard, Technical Specification 3GPP TS 36.331, 3rd Generation Partnership Project (3GPP), Mobile Competence Centre, 650, R0ute Des Lucioles, F-06921 Sophia-Antipolis Cedex, France, vol. RAN WG2, No. V14.3.0, Jul. 13, 2017 (Jul. 13, 2017), XP051336663, pp. 1-745.
International Search Report and Written Opinion—PCT/US2018/039683—ISA/EPO—dated Sep. 19, 2018.

* cited by examiner

METHODS TO OPTIMIZE SCELL CONFIGURATION AND ACTIVATION THROUGH UE IDLE MODE SCELL MEASUREMENTS AND QUICK REPORTING

PRIORITY

The present application claims priority to and the benefit of U.S. Provisional Patent Application No. 62/538,596, filed Jul. 28, 2017 and entitled "METHODS TO OPTIMIZE SCELL CONFIGURATION AND ACTIVATION THROUGH UE IDLE MODE SCELL MEASUREMENTS AND QUICK REPORTING" and claims priority to and the benefit of U.S. Provisional Patent Application No. 62/541,436, filed Aug. 4, 2017 and entitled "METHODS TO OPTIMIZE SCELL CONFIGURATION AND ACTIVATION THROUGH UE IDLE MODE SCELL MEASUREMENTS AND QUICK REPORTING", the contents of which are incorporated herein by reference in their entirety.

BACKGROUND

Field

Aspects of the present disclosure relate generally to wireless communication systems, and more particularly to improvements to configuration of connections between a mobile device and one or more base stations in wireless communication systems.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a 3rd generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method for wireless communication is disclosed. The method includes transmitting, by a mobile device, a connection establishment message to a first base station of a plurality of base stations. In an aspect, the connection establishment message may include information that indicates whether the mobile device has information associated with signals transmitted by one or more base stations of the plurality of base stations. The method also includes initiating, by the mobile device, transmission of the information associated with the signals to the first base station subsequent to establishing a security context for the connection between the mobile device and the first base station.

In one aspect of the disclosure, a method for wireless communication is disclosed. The method includes receiving, by a first base station, a connection establishment message from a mobile device. In an aspect, the connection establishment message may include information that indicates whether the mobile device has information associated with signals transmitted by one or more base stations of the plurality of base stations. The method also includes initiating, by the first base station, operations to establish the connection between the base station and the mobile device in response to receiving the connection establishment message, and receiving, by the first base station, the information associated with the signals from the mobile device subsequent to establishing a security context for the connection between the mobile device and the first base station.

In an additional aspect of the disclosure, a method for wireless communication is disclosed. The method includes determining, by a mobile device, information associated with signals transmitted by a plurality of base stations. The method also includes scrambling, by the mobile device, the information associated with signals to produce scrambled information, and transmitting, by the mobile device, the scrambled information to a first base station of the plurality of base stations prior to establishing a security context for a connection between the mobile device and the first base station.

In an additional aspect, a method for wireless communication is disclosed. The method includes receiving, by a first base station of a plurality of base stations, scrambled information associated with signals transmitted by one or more base stations of the plurality of base stations from a mobile device. The method also includes descrambling, by the first base station, the scrambled information associated with the signals subsequent to establishing a security context for a connection between the mobile device and the first base station.

In an additional aspect of the disclosure, an apparatus configured for wireless communication is disclosed. The apparatus includes means for transmitting a connection establishment message from a mobile device to a first base station of a plurality of base stations. In an aspect, the connection establishment message may include information that indicates whether a mobile device has information associated with signals transmitted by one or more base stations of the plurality of base stations. The apparatus also includes means for initiating transmission of the information associated with the signals to the first base station subsequent to establishing a security context for the connection between the mobile device and the first base station.

In an additional aspect of the disclosure, an apparatus configured for wireless communication is disclosed. The apparatus includes means for receiving a connection establishment message from a mobile device. In an aspect, the connection establishment message may include information that indicates whether the mobile device has information associated with signals transmitted by one or more base stations of a plurality of base stations. The apparatus also includes means for initiating operations to establish the connection between the base station and the mobile device in response to receiving the connection establishment message, and means for receiving the information associated with the signals from the mobile device subsequent to establishing a security context for the connection between the mobile device and the first base station.

In an additional aspect of the disclosure, an apparatus configured for wireless communication is disclosed. The apparatus includes means for determining information associated with signals transmitted by a plurality of base stations. The apparatus also include means for scrambling the information associated with signals to produce scrambled information, and means for transmitting the scrambled information to a first base station of the plurality of base stations prior to establishing a security context for a connection between a mobile device and the first base station.

In an additional aspect of the disclosure, an apparatus configured for wireless communication is disclosed. The apparatus includes means for receiving scrambled information at a first base station of a plurality of base stations from a mobile device, wherein the scrambled information is associated with signals transmitted by one or more base stations of the plurality of base stations. The apparatus also includes means for descrambling, by the first base station, the scrambled information associated with the signals subsequent to establishing a security context for a connection between the mobile device and the first base station.

In an additional aspect of the disclosure, a non-transitory computer-readable medium storing instructions that, when executed by one or more processors, cause the one or more processors to perform operations for wireless communication. The operations include transmitting a connection establishment message to a first base station of a plurality of base stations. In an aspect, the connection establishment message may include information that indicates whether a mobile device has information associated with signals transmitted by one or more base stations of the plurality of base stations. The operations also include initiating transmission of the information associated with the signals to the first base station subsequent to establishing a security context for the connection between the mobile device and the first base station.

In an additional aspect of the disclosure, a non-transitory computer-readable medium storing instructions that, when executed by one or more processors, cause the one or more processors to perform operations for wireless communication. The operations include receiving a connection establishment message from a mobile device at a first base station of a plurality of base stations. In an aspect, the connection establishment message may include information that indicates whether the mobile device has information associated with signals transmitted by one or more base stations of the plurality of base stations. The operations also include initiating operations to establish the connection between the base station and the mobile device in response to receiving the connection establishment message, and receiving the information associated with the signals from the mobile device subsequent to establishing a security context for the connection between the mobile device and the first base station.

In an additional aspect of the disclosure, a non-transitory computer-readable medium storing instructions that, when executed by one or more processors, cause the one or more processors to perform operations for wireless communication. The operations include determining, information associated with signals transmitted by a plurality of base stations. The operations also include scrambling the information associated with signals to produce scrambled information, and transmitting the scrambled information to a first base station of the plurality of base stations prior to establishing a security context for a connection between a mobile device and the first base station.

In an additional aspect of the disclosure, a non-transitory computer-readable medium storing instructions that, when executed by one or more processors, cause the one or more processors to perform operations for wireless communication. The operations include receiving, by a first base station of a plurality of base stations, scrambled information associated with signals transmitted by one or more base stations of the plurality of base stations from a mobile device, and descrambling, by the first base station, the scrambled information associated with the signals subsequent to establishing a security context for a connection between the mobile device and the first base station.

In an additional aspect of the disclosure, an apparatus configured for wireless communication is disclosed. The apparatus includes at least one processor, and a memory coupled to the processor. The processor is configured to transmit a connection establishment message to a first base station of a plurality of base stations. In an aspect, the connection establishment message may include information that indicates whether the mobile device has information associated with signals transmitted by one or more base stations of the plurality of base stations. The at least one processor is also configured to initiate transmission of the information associated with the signals to the first base station subsequent to establishing a security context for the connection between the mobile device and the first base station.

In an additional aspect of the disclosure, an apparatus configured for wireless communication is disclosed. The apparatus includes at least one processor, and a memory coupled to the processor. The processor is configured to receive a connection establishment message from a mobile device at a first base station. In an aspect, the connection establishment message may include information that indicates whether the mobile device has information associated with signals transmitted by one or more base stations of the plurality of base stations. The at least one processor is also configured to initiate operations to establish the connection between the base station and the mobile device in response to receiving the connection establishment message, and to receive the information associated with the signals from the mobile device subsequent to establishing a security context for the connection between the mobile device and the first base station.

In an additional aspect of the disclosure, an apparatus configured for wireless communication is disclosed. The apparatus includes at least one processor, and a memory coupled to the processor. The processor is configured to determine information associated with signals transmitted by a plurality of base stations. The at least one processor is also configured to scramble the information associated with signals to produce scrambled information, and transmit the scrambled information from a mobile device to a first base station of the plurality of base stations prior to establishing a security context for a connection between the mobile device and the first base station.

In an additional aspect of the disclosure, an apparatus configured for wireless communication is disclosed. The apparatus includes at least one processor, and a memory coupled to the processor. The processor is configured to receive scrambled information from a mobile device at a first base station of a plurality of base stations, wherein the scrambled information is associated with signals transmitted by one or more base stations of the plurality of base stations. The at least one processor is also configured to descramble the scrambled information associated with the signals subsequent to establishing a security context for a connection between the mobile device and the first base station.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
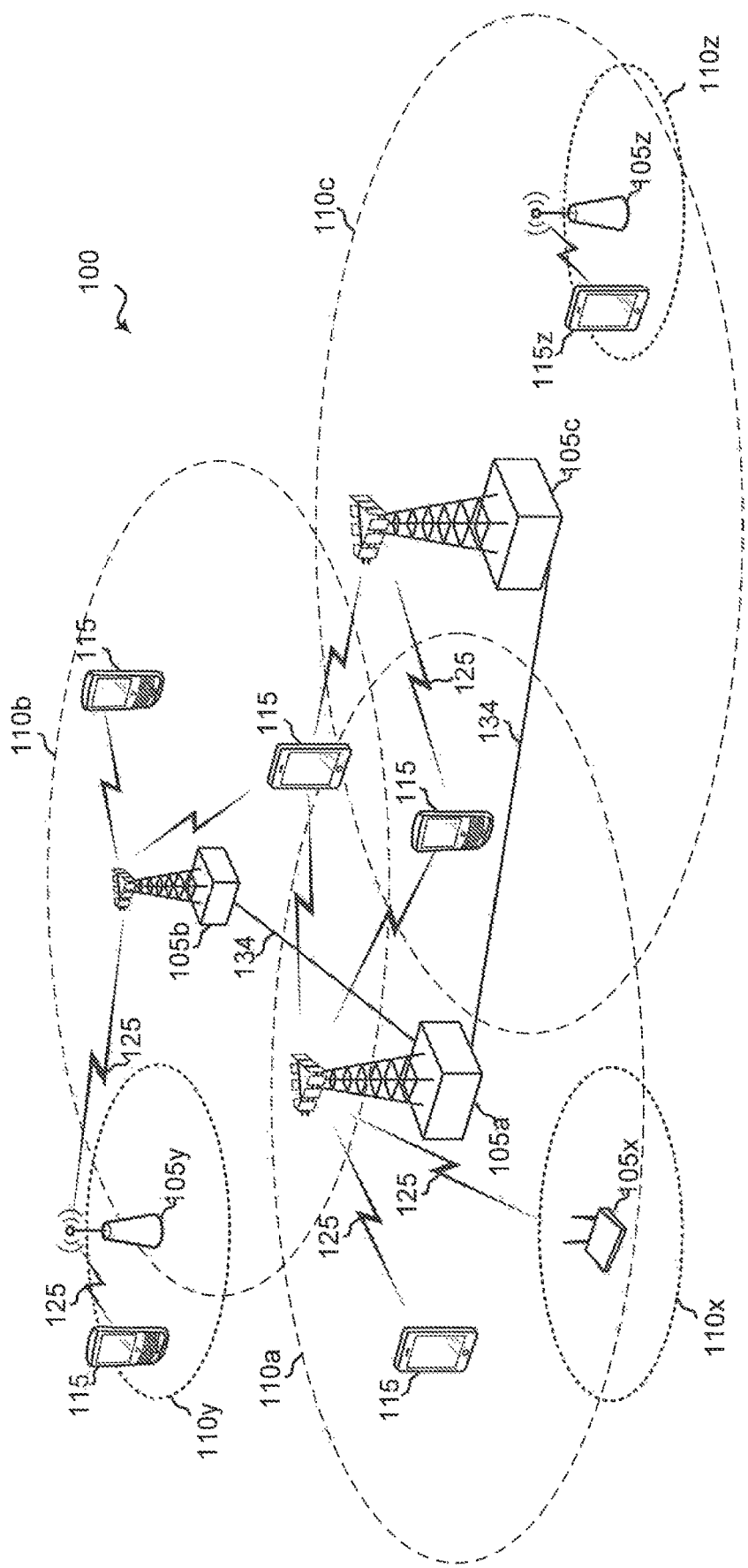
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as CDMA networks, TDMA networks, FDMA networks, orthogonal FDMA (OFDMA) networks, single-carrier FDMA (SC-FDMA) networks, long term evolution (LTE) networks, Global System for Mobile Communications (GSM) networks, as well as other communications networks. As described herein, the terms "networks" and "systems" may be used interchangeably.

A CDMA network may implement a radio technology such as UTRA, CDMA2000, and the like. UTRA includes wideband-CDMA (W-CDMA) and low chip rate (LCR). CDMA2000 covers IS-2000, IS-95, and IS-856 standards.

A TDMA network may implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or UEs. A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from the 3GPP, and CDMA2000 is described in documents from the 3GPP2. These various radio technologies and standards are known or are being developed. For example, the 3rd Generation Partnership Project (3GPP) is a collaboration between groups of telecommunications associations that aims to define a globally applicable 3G mobile phone specification. LTE is a 3GPP project aimed at improving the UMTS mobile phone standard. The 3GPP may define specifications for the next generation of mobile networks, mobile systems, and mobile devices. For clarity, certain an aspect of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-Advanced (LTE-A) including unlicensed spectrum has also been suggested that can be compatible with carrier-grade Wi-Fi, making LTE/LTE-A with unlicensed spectrum an alternative to Wi-Fi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. Multiple-input and multiple-output (MIMO) systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHz. In LTE, an RB is defined as 12 sub-carriers when the subcarrier bandwidth is 15 kHz, or 24 sub-carriers when the sub-carrier bandwidth is 7.5 kilohertz (kHz). In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which, in an embodiment, may be an LTE-A network. In another embodiment, the wireless network 100 may be another type of network, such as a next generation 5G network. The wireless network 100 includes a number of base stations 105 and other network entities. In an embodiment, the base stations 105 may include evolved node Bs (eNBs). In an embodiment, the base stations 105 may include next generation node Bs (gNBs). A base station 105 that communicates with the UEs may also be referred to as a base station, a node B, an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UIEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105a, 105b and 105c are macro base stations for the macro cells 110a, 110b and 110c, respectively. The base stations 105x, 105y, and 105z are small cell base stations, which may include pico or femto base stations that provide service to small cells 110x, 110y, and 110z, respectively. A base station may support one or multiple (e.g., two, three, four, and the like) cells.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro base stations, pico base stations, femto base stations, relays, and the like. In FIG. 1, a lightning bolt (e.g., communication links 125) indicates wireless transmissions between a UE and a serving base station, which is a base station designated to serve the UE on the downlink and/or uplink, or desired transmission between base stations. Wired backhaul communication 134 indicate wired backhaul communications that may occur between base stations.

LTE/-A utilizes OFDM on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 MHz, respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
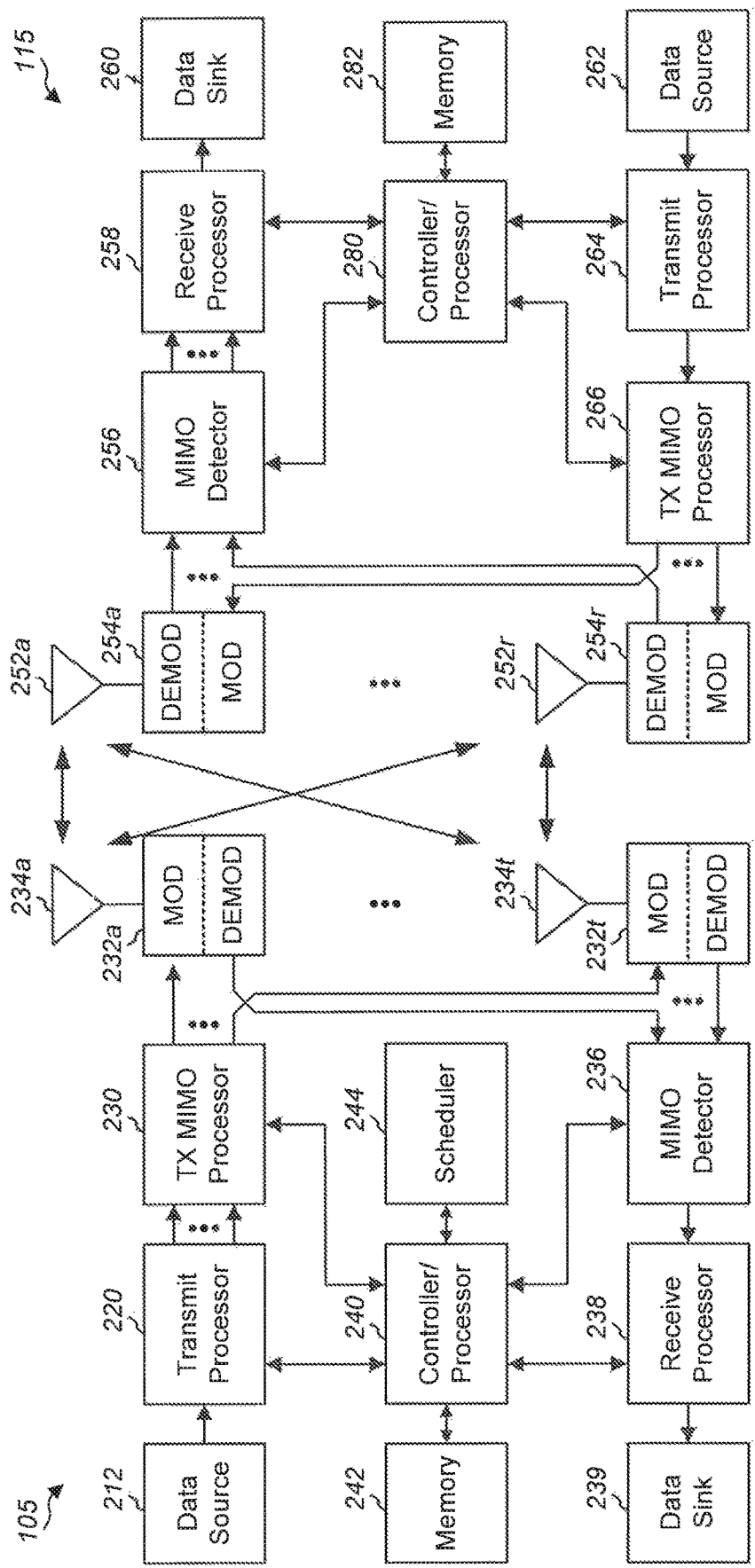
FIG. 2 is a block diagram conceptually illustrating a design of a base station/eNB and a UE configured according to one aspect of the present disclosure.

FIG. 2 shows a block diagram of a design of a base station 105 and a UE 115, which may be one of the base stations and one of the UEs in FIG. 1. For a restricted association scenario, the base station 105 may be the small cell base station 105z in FIG. 1, and the UE 115 may be the UE II 5z, which in order to access small cell base station 105z, would be included in a list of accessible UEs for small cell base station 105z. The eNB 105 may also be a base station of some other type. The base station 105 may be equipped with antennas 234a through 234t, and the UE 115 may be equipped with antennas 252a through 252r.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ indicator channel (PHICH), physical downlink control channel (PDCCH), etc. The data may be for the physical downlink shared channel (PDSCH), etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) MIMO processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIGS. 7 and 8 and may support the functionality of the operations described with reference to FIGS. 4-6, and/or other processes for the techniques described herein. The memories 242 and 282 may store data and program codes for the eNB 105 and the UE 115, respectively. A scheduler 244 may schedule UEs for data transmission on the downlink and/or uplink.

Figure 3:
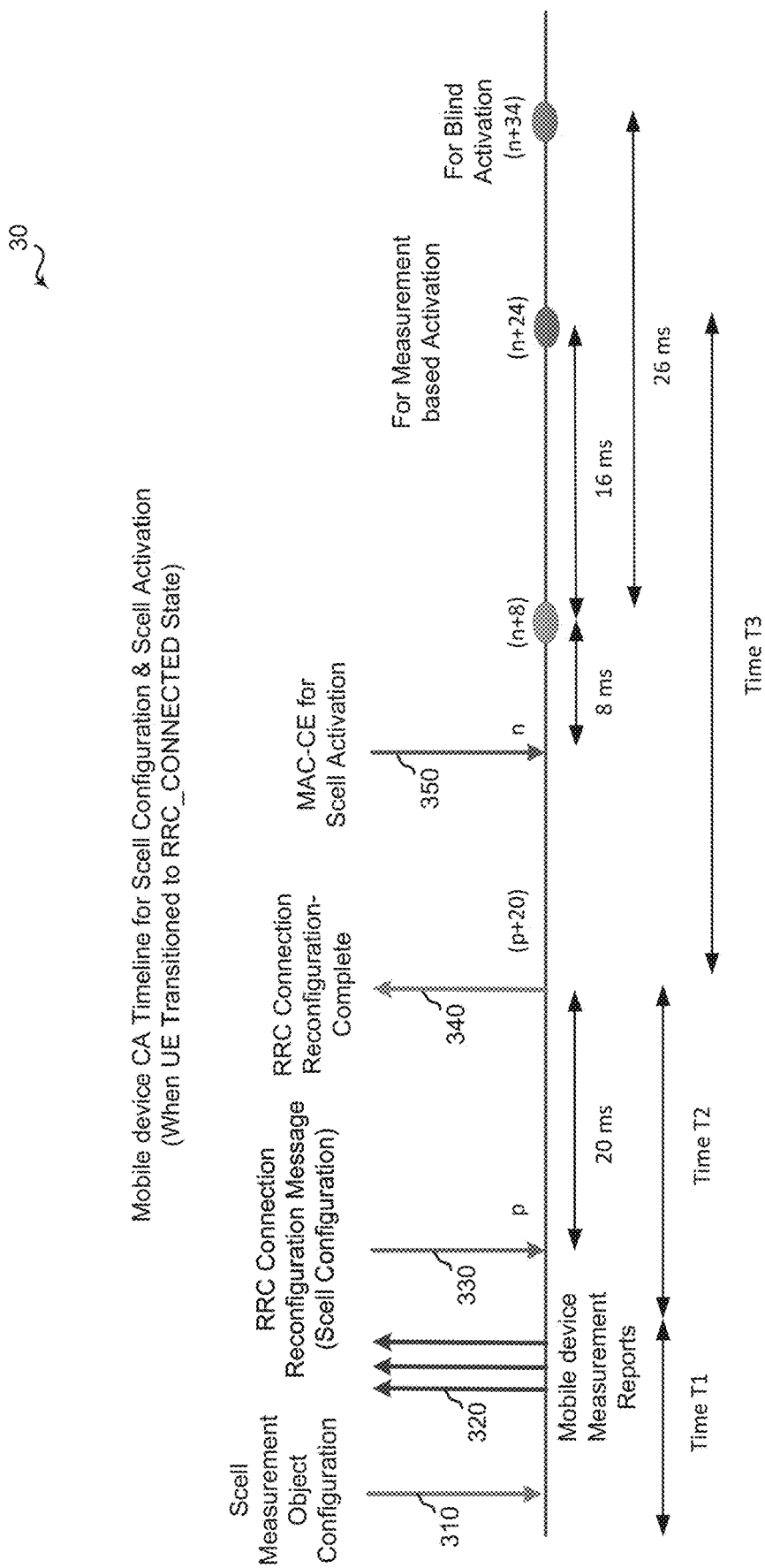
FIG. 3 is a diagram illustrating aspects related to timing for configuration and activation of secondary cells (SCells) during a transition of a mobile device to a radio resource control (RRC) connected state.

Referring to FIG. 3, a diagram illustrating aspects related to timing for configuration and activation of SCells during a transition of a mobile device to an RRC_connected state is shown. In Release-10, LTE-A carrier aggregation (CA) was introduced and supported up to 5 CA (e.g., 1 PCell and up to 4 SCells). In Release-12, dual connectivity was introduced, which allowed CA between 2 base stations, and Release-13 introduced 32 CA (e.g., 1 PCell and up to 31 SCells). However, current CA procedures are based on the Release-10 CA design, which is summarized below.

In the Release-10 design for configuration of CA, a mobile device (e.g., the UE 115 of FIGS. 1 and 2) indicates its CA capabilities to a base station (e.g., the base station 105 of FIGS. 1 and 2) via an RRC "Capability Information" message, and the base station may determine a CA configuration for the mobile device based at least in part on the capabilities of the mobile device indicated in the RRC Capability Information message. For example, if the mobile device capabilities indicate that the mobile device supports 2 CA, the base station, operating as a primary cell (PCell) with respect to the mobile device, may configure the mobile device to receive data from the PCell and 1 SCell. As shown in FIG. 3, during a transition of the mobile device to an RRC_Connected State, the base station (e.g., one of the base stations 105 of FIGS. 1 and 2) may transmit, at 310, an SCell measurement object configuration message to the mobile device that instructs the mobile device to obtain and report measurements associated with one or more SCells. In response to receiving the SCell measurement object configuration message, the mobile device may monitor one or more carrier frequencies associated with signals transmitted by the one or more SCells, and, at 320, the mobile device may transmit a measurement report(s) to the base station that includes information associated with the monitored one or more carrier frequencies. The measurement report(s) may contain information that identifies one or more SCells from which the mobile device was able to receive signals, characteristics of those signals (e.g., signal strength, signal-to-noise-ratio (SNR), and the like), memory buffer data, channel conditions, other types of information, or a combination thereof.

The base station may transmit a message to the mobile device to configure the mobile device to operate in accordance with the CA configuration determined by the base station. In an aspect, this message may be a RRC Reconfiguration Message for "SCell Configuration," as shown at 330, and the mobile device may transmit a response to the RRC Reconfiguration Message, as shown at 340. In an aspect, the response to the RRC Reconfiguration Message may be an RRC Connection Reconfiguration Complete Message. Upon SCell Configuration, the SCell may remain in a Deactivated State (e.g., by default). Based on the information included in the measurement report(s) received from the mobile device, the base station may transmit additional signaling to activate the SCell(s) that are to be used for the CA configuration of the mobile device. In an aspect, this activation signaling may include transmission of a media access control (MAC)-control element (CE) command, as shown at 350. When the SCell(s) is activated, the mobile device monitors the SCell's PDCCH while operating in a connected mode discontinuous reception (CDRX) ON State. In an aspect, the CDRX may be common for both the PCell and SCell(s). When a downlink (DL) SCell activation (e.g., via the MAC-CE) is received in subframe (SF) "n", the mobile device may perform the following SCell actions by SF n+24 or n+34, but not before n+8: channel state indicator (CSI) (e.g., channel quality indicator (CQI)/precoding matrix indicator (PMI)/rank indicator (RI)) reports, PDCCH monitoring on SCell, uplink (UL) sounding reference signal (SRS) transmissions, PDSCH Reception/PUSCH transmission.

As explained above, while the mobile device is in the RRC_Connected State, and after the SCell(s) is configured and activated, a common CDRX mechanism may be applicable for both PCell and any active SCells. During a CDRX ON Period, the mobile device monitors PDCCH transmissions for both PCell and Active SCells. When a DL SCell deactivation (e.g., via MAC control element) is received in SF n, UE shall stop the following SCell actions no later than n+8: Stop normal SCell operation (e.g., UL SRS transmissions, CSI (CQI/PMI/RI) reporting, PDCCH monitoring on/for the SCell, and PDSCH reception/PUSCH transmission) and Stop the SCellDeactivation timer.

In the process described above, the mobile device may transition from RRC_Idle State to an RRC_Connected State through a mobile device Initiated RRC Connection Setup Procedure, and, upon entering into the RRC_Connected State, based on the base station implementation, the base station configures the mobile device with SCell Measurement Object(s) (e.g., the SCell measurement object configuration message illustrated at 310). The mobile device then performs SCell Measurements and sends Measurement Reports, at 320, and, based on measurement reports received from the mobile device, the base station decides which SCell(s) to be configured through RRC Connection Reconfiguration procedure, as shown at 330. However, the steps associated with the base station's configuration of SCell Measurement Objects and the mobile device performing SCell measurements and measurement reporting increases latency while adding SCells. This latency could be of the order of 10 ms to 100 ms. Additionally, once the SCell is configured, the base station typically requests additional SCell Measurement Reports from the mobile device to determine whether to activate the SCell (e.g., through MAC-CE procedure described above at 350). Thus, existing techniques for performing measurement-based SCell configuration and measurement-based MAC-CE activation involve significant latency and prevents base stations from performing quick SCell addition and activation to offload bursty traffic in a quick and efficient manner to licensed or unlicensed SCells.

The present application discloses improvements to wireless communication systems through new techniques for performing various portions of the above-described processes in a manner that facilitates effective utilization of SCells and enables quick scheduling on SCell(s) (e.g., for quick bursty data offload) by reducing the latency associated with SCell measurement and reporting while configuring and activating SCells when a mobile device is transitioning to an RRC_Connected Mode. As described in more detail below, latency associated with CA SCell Configuration (Addition) is reduced using quick SCell measurement reporting techniques based on measurements of potential SCell signals while a mobile device is in a non-RRC_Connected State, such as an RRC_Idle Mode State, an RRC_Suspended Mode State, an RLF Recovery State, and/or an Radio Link Failure (RLF) State. It is noted that although various aspects of the present disclosure may refer to particular wireless communication systems, such as LTE Advanced wireless communication networks and systems, such references are provided for purposes of illustration, rather than by way of limitation. Thus, it should be understood that the embodiments of the present application may be applied to provide similar improvements in other types of wireless communication networks and systems, such as $5^{th}$ Generation (5G) new radio (NR) wireless communication networks and systems.

Figure 4:
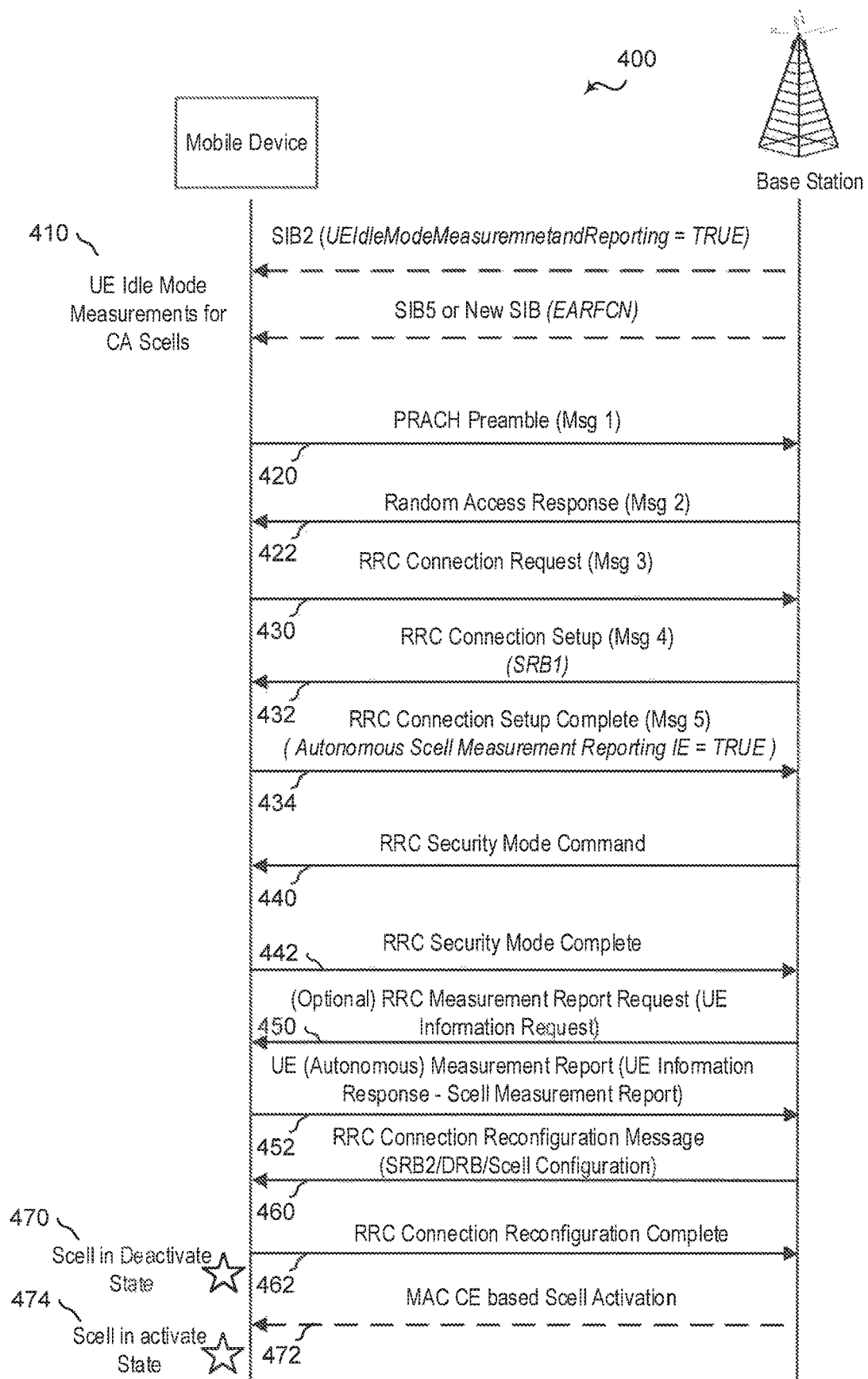
FIG. 4 is a ladder diagram illustrating aspects of signaling that may be exchanged during a transition of a mobile device from an RRC_Idle State to an RRC_Connected State in accordance with aspects of the present disclosure.

Referring to FIG. 4, a ladder diagram illustrating aspects of signaling that may be exchanged during a transition of a mobile device from an RRC_Idle State to an RRC_Connected State in accordance with aspects of the present disclosure is shown as signaling 400. As described below, the signaling 400 illustrated in FIG. 4 may be exchanged between a mobile device (e.g., the UE 115 of FIGS. 1 and 2) and a base station (e.g., the base station 105 of FIGS. 1 and 2) to transition of a mobile device from an RRC_Idle State to the RRC_Connected State in accordance with aspects of the present disclosure.

In an aspect, the mobile device illustrated in FIG. 4 may be initially operating in an RRC_Idle Mode State and while operating in the RRC_Idle Mode State, the mobile device may obtain information associated with signals transmitted by one or more base stations of a plurality of base stations, as indicated at 410. The information associated with the signals may include one or more measurements corresponding to each of the signals. The one or more measurements may indicate a signal quality, such as reference signal receive power (RSRP), reference signal receive quality (RSRQ), a signal-to-noise-ratio, etc., for each of the monitored signals, and/or other characteristics of the monitored signals. In an aspect, at least a portion of the information associated with the signals may be autonomously obtained and/or reported by the mobile device without receiving a UE measurement report request from the base station. The UE measurement report request may be included in an RRC UE Information Request. In an aspect, the UE measurement report request may be included in a MAC-CE message, such as an uplink grant for measurement reporting by the mobile device. As described in more detail below, the signals monitored by the mobile device may include carrier frequencies (also referred to herein as component carriers) associated with signals transmitted by a plurality of base stations (e.g., a PCell and one or more SCells), which may be reported in a UE Information Response message.

The mobile device may transmit information that indicates a capability of the mobile device to autonomously obtain the information associated with the signals to the base station. In an aspect, this capability information may be transmitted to the base station prior to transmission of a connection establishment message. In additional or alternative aspects, the information that indicates the capability of the mobile device may be included in the connection establishment message transmitted to the base station. In still another aspect, information that indicates the capabilities (e.g., autonomous measurements, CA capabilities, and the like) of the mobile device may be stored in a database accessible to the base station, and the base station may determine the capabilities of the mobile device without receiving capability information via an exchange of signaling or messages with the mobile device.

In FIG. 4, the base station, which may be a PCell with respect to the mobile device, may broadcast various system information blocks (SIBs) that may be received by mobile devices operating within a coverage area of the base station. One or more of the SIBs broadcast by the base station may include information that identifies one or more carrier frequencies supported by the base station and/or one or more carrier frequencies supported by one or more SCells. In an aspect, the information that identifies one or more carrier frequencies supported by the base station may be included in a first SIB, and the information that identifies one or more carrier frequencies supported by the one or more SCells may be included in a second SIB. In additional or alternative aspects, the information that identifies one or more carrier frequencies supported by the base station and the information that identifies one or more carrier frequencies supported by the one or more SCells may be included in a single SIB. In an aspect, the mobile device may monitor one or more of the SIBs broadcast by the base station to determine the signals that the mobile device is to monitor while operating in the RRC_Idle Mode State. In an aspect, the information that identifies the one or more carrier frequencies may be included in one or more existing SIBs, such as SIB 2 and SIB5, as shown in FIG. 4. In additional or alternative aspects, a new SIB may be used to facilitate aspects of embodiments of the present application. When the mobile device includes capabilities to operate in a CA mode, the monitored signals may be determined based on the capability of the mobile device and the supported CA Band Combinations of the mobile device based on the SIB information.

At some point, the mobile device may initiate operations to transition from the RRC_Idle Mode State to an RRC_Connected state. For example, as illustrated in FIG. 4, at step 420, the mobile device may transmit a message to the base station to signal that the mobile device is transitioning from the RRC_Idle Mode State to an RRC_Connected state. In an aspect, this message may be transmitted using a physical random access channel (PRACH) message. In an aspect, the mobile device may also monitor the signals during a random access channel (RACH) procedure, where, for example, the mobile device utilizes the waiting time as an opportunity to perform measurements on SCells while waiting for next PRACH occasion (e.g., when attempting to transmit the message at step 420). This may be beneficial as the measurements would be obtained just prior to the mobile device initiating operations to transition from the RRC_Idle Mode State to the RRC_Connected Mode State, which would cause the measurement report to contain fresh (i.e., non-stale) information. As shown at step 422, the base station may respond to the message by transmitting a response message to the mobile station. In an aspect, the response message may be a Random Access Response message.

After receiving the response message from the base station, the mobile device may transmit a connection establishment message to the base station, as step 430. In an aspect, the connection establishment message may be an RRC Connection Request message. As shown in FIG. 4, the connection establishment message may include information that indicates whether the mobile device has information associated with signals transmitted by one or more base stations of the plurality of base stations. This may indicate to the base station that the mobile device has already obtained information associated with the signals that the mobile device has been monitoring while in the RRC_Idle Mode State, which may enable the mobile device to provide those measurements to the base station earlier in the signaling exchange than the technique described above with respect to FIG. 3, as described in more detail below. In an aspect, one of the SIBs broadcast by the base station may include information that indicates whether the base station supports early transmission of measurement reports by mobile device, and the information included in the connection establishment message that indicates whether the mobile device has information associated with signals transmitted by one or more base stations of the plurality of base stations may only be included when the SIB indicates that the base station support early transmission of the measurement reports. If the base station does not support early transmission of the measurement reports, the mobile device may not obtain measurement while operating in the RRC_Idle Mode State, and may report the measurements to the base station in accordance with the techniques described above with reference to FIG. 3. This may ensure that the reported measurements are not stale.

Subsequent to transmitting the connection establishment message, the mobile device may receive, at step 432, a connection setup message from the base station. In an aspect, the connection setup message may be an RRC Connection Setup message. After receiving the connection setup message, the mobile device may transmit a connection setup complete message to the base station, at step 434. In an aspect, the connection setup complete message may be an RRC Connection Setup Complete message.

Once the connection setup signaling is complete (e.g., after step 434), the base station may transmit a security context establishment message to the mobile device, at step 440. The security context establishment message may include one or more parameters for establishing a security context for the connection between the mobile device and the base station. In an aspect, the security context establishment message may be an RRC Security Mode Command message. The mobile device may configure a security context for the connection between the mobile device and the base station and, once the security context is configured, may transmit, at step 442, a security context complete message to the base station. In an aspect, the security context complete message may be an RRC Security Mode Complete message. In an aspect, the security context established as a result of steps 440 and 442 may be an access stratum (AS) security context.

In an aspect, once the security context for the connection between the mobile device and the base station is completed (e.g., after step 442) the mobile device may autonomously transmit the information associated with the signals monitored by the mobile device while operating in the RRC_Idle Mode State to the base station. This information may be transmitted without receiving, at the mobile device, a UE measurement report request message (e.g., a message requesting that the mobile device monitor signals associated with one or more other base stations and provide, to the base station, information associated with the monitored signals) from the base station. The information associated with the signals may include one or more timestamps, and each of the one or more timestamps may correspond to a time when information associated with a particular one of the signals was obtained by the mobile device. This may enable the base station to determine whether the measurements included in the information associated with the signals received from the mobile device is stale.

In an aspect, if the base station determines that one or more of the measurements included in the information associated with the signals received from the mobile device is stale, the base station may request updated measurements from the mobile device. For example, as indicated at step 450, the base station may transmit a UE measurement report request message (e.g., a UE Information Request Message) to the mobile device, instructing the mobile device to obtain updated measurements for the one or more stale measurements previously reported by the mobile device. In an aspect, the UE Information Response (e.g., the message that includes the measurements associated with the signals) or other measurement report message may be received from the mobile device via RRC signaling, and the mobile device may obtain the updated measurements and transmit them to the base station in accordance with the uplink grant, as indicated at step 452.

In an aspect, rather than autonomously reporting the information associated with the signals, the mobile device may wait until a UE measurement report request message (e.g., a UE Information Request) is received from the base station (e.g., step 450), and may transmit (e.g., in a UE Information Response) the information associated with the signals in response to receiving the UE measurement report request message (e.g., at step 452). It is noted that the base station may be able to request the measurement reports sooner because the mobile device has previously signaled to the base station (e.g., in message 5 if step 432) whether the mobile device has already obtained the information associated with the signals (e.g., at step 430).

After receiving the measurement report from the mobile device, at step 442, at step 452, or steps 442 and 452, the base station may determine one or more SCells for supporting a CA capability of the mobile device, and transmit, at step 460, a connection configuration message to the mobile device. The connection configuration message may include one or more parameters for configuring a CA mode of the mobile device. For example, the one or more parameters may identify one or more SCells that are to be activated for supporting the CA mode of the mobile device. In an aspect, the connection configuration message may be an RRC Connection Reconfiguration message. In response to receiving the connection message, the mobile device may configure the CA mode based on the information included in the connection message and may transmit a connection configuration complete message to the base station to indicate that the CA mode has been configured by the mobile device, at step 462. In an aspect, the connection configuration complete message may be an RRC Connection Reconfiguration Complete message.

As shown at step 470, at the time the mobile device transmits the connection configuration complete message, the one or more SCells may remain in a deactivated state (e.g., not activated to facilitate CA transmission of data to the mobile device). At step 472, the base station may transmit an SCell Activation message, which may activate the one or more SCells, as indicated at step 474. In an aspect, the SCell Activation message may be a MAC-CE-based SCell Activation message. Upon activation of the SCells, the mobile device may receive data from the base station via a first component carrier, and may receive data from a second base station (e.g., an SCell) via a second component carrier (e.g., a component carrier that is different from the first component carrier). It is noted that embodiments may support CA operations of a mobile device with any number of component carriers (currently limited to 32 in LTE Advanced Release-13).

As shown above, aspects of the signaling 400 illustrated in FIG. 4 provide improved performance for wireless communication systems. In particular, the signaling 400 enables a base station to quickly configure SCells by reducing latency associated with a mobile device obtaining information associated with signals from one or more base stations and reporting that information to a base station during a transition of the mobile device from an RRC_Idle Mode State to an RRC_Connected Mode State. Thus, various aspects of the signaling 400 provide improvements to wireless communication systems.

Figure 5:
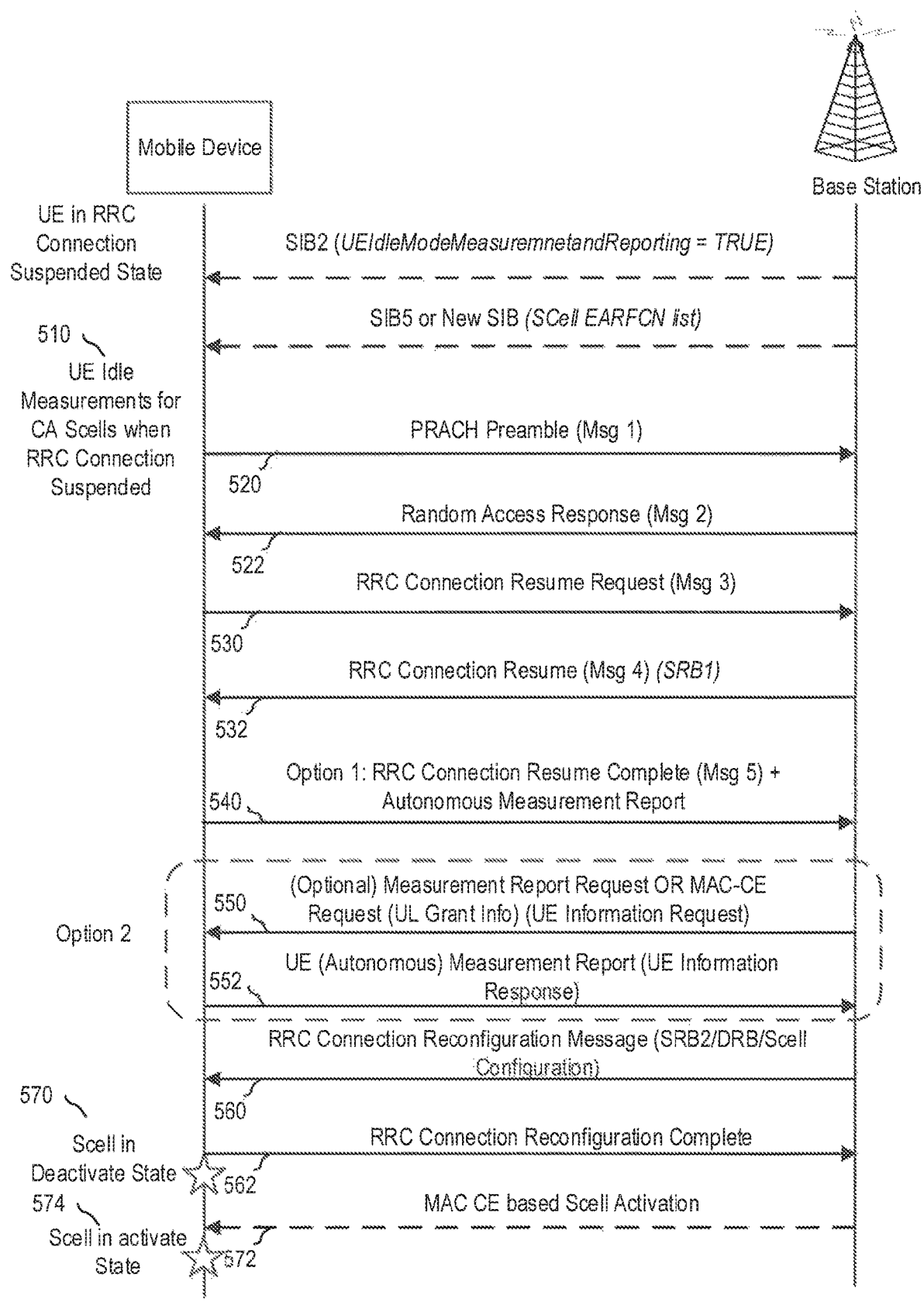
FIG. 5 is a ladder diagram illustrating aspects of signaling that may be exchanged during a transition of a mobile device from an RRC_Suspended State to an RRC_Connected State in accordance with aspects of the present disclosure.

Referring to FIG. 5, a ladder diagram illustrating aspects of signaling that may be exchanged during a transition of a mobile device from an RRC_Suspended State to an RRC_Connected State in accordance with aspects of the present disclosure is shown as signaling 500. As described below, In an aspect, the signaling 500 illustrated in FIG. 5 may be exchanged between a mobile device (e.g., the UE 115 of FIGS. 1 and 2) and a base station (e.g., the base station 105 of FIGS. 1 and 2) to transition of a mobile device from an RRC_Suspended State to the RRC_Connected State in accordance with aspects of the present disclosure.

In an aspect, the mobile device illustrated in FIG. 5 is initially operating in an RRC_Suspended State. When an RRC connection is suspended, the mobile device stores information associated with an active security context (e.g., the security context established during setup of the connection that is being suspended) and a Resume Identity (e.g., resumeIdentity) for the mobile device, and then the mobile device transitions to the RRC_Idle State. The RRC message used to suspend the RRC connection is integrity protected and ciphered, and suspension can only be performed when at least one dedicated radio bearer (DRB) is successfully established. Once suspended, the RRC connection may be resumed, using a connection resume operation, as described in more detail below.

In an aspect, while the RRC connection is suspended, the mobile device may obtain information associated with signals transmitted by one or more base stations of a plurality of base stations, as indicated at 510. In an aspect, the information associated with the signals may include one or more measurements corresponding to each of the signals. The one or more measurements may indicate a signal quality, such as reference signal receive power (RSRP), reference signal receive quality (RSRQ), a signal-to-noise-ratio, etc., for each of the monitored signals, and/or other characteristics of the monitored signals. In an aspect, at least a portion of the information associated with the signals may be autonomously obtained and/or reported by the mobile device without receiving a UE measurement report request from the base station. In an aspect, the UE Information Response (e.g., the message that includes the measurements associated with the signals) or other measurement report message may be received from the mobile device via RRC signaling. As described in more detail below, the signals monitored by the mobile device may include carrier frequencies (also referred to herein as component carriers) associated with signals transmitted by a plurality of base stations (e.g., a PCell and one or more SCells).

In an aspect, the mobile device may transmit information that indicates a capability (e.g., autonomous measurements, CA capabilities, and the like) of the mobile device to autonomously obtain the information associated with the signals to the base station. The capability information may be transmitted to the base station prior to transmission of a connection establishment message and/or prior to suspending the RRC connection between the base station and the mobile device. The information that indicates the capability of the mobile device may additionally or alternatively be included in a connection establishment message transmitted to the base station. In still another aspect, information that indicates the capabilities of the mobile device may be stored in a database accessible to the base station, and the base station may determine the capabilities of the mobile device without receiving capability information via an exchange of signaling or messages with the mobile device.

In FIG. 5, the base station, which may be a PCell with respect to the mobile device, may broadcast various system information blocks (SIBs) that may be received by mobile devices operating within a coverage area of the base station. One or more of the SIBs broadcast by the base station may include information that identifies one or more carrier frequencies supported by the base station and/or one or more carrier frequencies supported by one or more SCells. The information that identifies one or more carrier frequencies supported by the base station may be included in a first SIB, and the information that identifies one or more carrier frequencies supported by the one or more SCells may be included in a second SIB or may be included in a single SIB. In an aspect, the mobile device may monitor one or more of the SIBs broadcast by the base station to determine the signals that the mobile device is to monitor while operating in the RRC_Idle Mode State. In an aspect, the information that identifies the one or more carrier frequencies may be included in one or more existing SIBs, such as SIB 2 or SIB5, as shown in FIG. 5. In additional or alternative aspects, a new SIB may be used to facilitate aspects of embodiments of the present application. When the mobile device includes capabilities to operate in a CA mode, the monitored signals may be determined based on the capability of the mobile device and the supported CA Band Combinations of the mobile device based on the SIB information.

When the mobile device determines to resume the suspended RRC connection, the mobile device may initiate operations to resume the RRC connection between the mobile device and the base station. In an aspect, as shown in FIG. 5, at step 520, to resume the connection, the mobile device may transmit a message to the base station to signal that the mobile device is transitioning from the RRC_Suspended Mode State to an RRC_Connected state. In an aspect, this message may be transmitted using a physical random access channel (PRACH) message. In an aspect, the mobile device may also monitor the signals during a random access channel (RACH) procedure, where, for example, the mobile device utilizes the waiting time as an opportunity to perform measurements on SCells while waiting for next PRACH occasion (e.g., when attempting to transmit the message at step 520). This may be beneficial as the measurements would be obtained just prior to the mobile device initiating operations to resume the connection, which would cause the measurement report to contain fresh (i.e., non-stale) information. As shown at step 522, the base station may respond to the message by transmitting a response message to the mobile station. In an aspect, the response message may be a Random Access Response message.

After receiving the response message from the base station, the mobile device may transmit a connection establishment message to the base station, as step 530. In an aspect, the connection establishment signaling messages may utilize RRC signaling. As shown in FIG. 5, the connection establishment signaling messages may include information that indicates whether the mobile device has information associated with signals transmitted by one or more base stations of the plurality of base stations. This may indicate to the base station that the mobile device has already obtained information associated with the signals that the mobile device has been monitoring while in the connection between the mobile device and the base station was suspended, which may enable the mobile device to provide those measurements to the base station earlier in the signaling exchange than the technique described above with respect to FIG. 3, as described in more detail below. In an aspect, one of the SIBs broadcast by the base station may include information that indicates whether the base station supports early transmission of measurement reports by mobile device, and the information included in the connection establishment message that indicates whether the mobile device has information associated with signals transmitted by one or more base stations of the plurality of base stations may only be included when the SIB indicates that the base station support early transmission of the measurement reports. If the base station does not support early transmission of the measurement reports, the mobile device may not obtain measurements while the connection between the mobile device and the base station was suspended, and may report the measurements to the base station in accordance with the techniques described above with reference to FIG. 3. This may ensure that the reported measurements are not stale.

Subsequent to transmitting the connection establishment message, the mobile device may receive, at step 532, a connection resume message from the base station. In an aspect, the connection setup message may be an RRC_Connection Resume message. As explained above, because the mobile device stores the security context and other information associated with the prior connection prior to suspending the connect, the connection may be activated (e.g., established) after the mobile device receives the connection resume message from the base station. Thus, unlike the signaling 400 illustrated in FIG. 4, the signaling 500 illustrated in FIG. 5 does not require signaling of security context information between the mobile device and the base station.

As shown at step 540, the mobile device may transmit a connection resume complete message to the base station. In an aspect, the connection resume complete message may be an RRC_Connection Setup Complete message. In an aspect, because the security context for the connection has already been established (e.g., based on the security context established prior to suspension of the connection), the mobile device may include the information associated with the signals monitored by the mobile device while the connection was suspended in the connection resume complete message transmitted to the base station. In an aspect, this information may be transmitted without receiving, from the base station at the mobile device, a UE measurement report request message (e.g., a UE Information Request) requesting that the mobile device monitor signals associated with one or more other base stations and provide, to the base station, the information associated with the monitored signals. In an aspect, the information associated with the signals may include one or more timestamps, and each of the one or more timestamps may correspond to a time when information associated with a particular one of the signals was obtained by the mobile device. This may enable the base station to determine whether the measurements included in the information associated with the signals received from the mobile device is stale.

In an aspect, if the base station determines that one or more of the measurements included in the information associated with the signals received from the mobile device is stale, the base station may request updated measurements from the mobile device. For example, as indicated at step 550, the base station may transmit a UE measurement report request message to the mobile device, instructing the mobile device to obtain updated measurements for the one or more stale measurements previously reported by the mobile device. In an aspect, the UE measurement report request message may be an RRC Measurement Report Request (e.g., a UE Information Request). In an aspect, the UE measurement report may be included in a MAC-CE message including an uplink grant for measurement reporting by the mobile device, and the mobile device may obtain the updated measurements and transmit them to the base station in accordance with the uplink grant, as indicated at step 552.

In an alternative aspect, rather than include the information associated with the signals in the connection resume message (e.g., at step 540), the mobile device may wait until a UE measurement report request message is received from the base station, at step 550, and may transmit the information associated with the signals in response to receiving the UE measurement report request message, at step 552. It is noted that in this alternative aspect, the base station may be able to request the measurement reports sooner because the mobile device has previously signaled to the base station whether the mobile device has already obtained the information associated with the signals (e.g., at step 530).

After receiving the measurement report from the mobile device, at step 540, at step 552, or both steps 540 and 552, the base station may determine one or more SCells for supporting a CA capability of the mobile device, and transmit, at step 560, a connection configuration message to the mobile device. The connection configuration message may include one or more parameters for configuring a CA mode of the mobile device. For example, the one or more parameters may identify one or more SCells that are to be activated for supporting the CA mode of the mobile device. In an aspect, the connection configuration message may be an RRC Connection Reconfiguration message. In response to receiving the connection configuration message, the mobile device may configure the CA mode based on the information included in the connection configuration message, and may transmit a connection configuration complete message to the base station to indicate that the CA mode has been configured by the mobile device, at step 562. In an aspect, the connection configuration complete message may be an RRC Connection Reconfiguration Complete message.

As shown at step 570, at the time the mobile device transmits the connection configuration complete message, the one or more SCells may remain in a deactivated state (e.g., not activated to facilitate CA transmission of data to the mobile device). At step 572, the base station may transmit an SCell Activation message, which may activate the one or more SCells, as indicated at step 574. In an aspect, the SCell Activation message may be a MAC-CE-based SCell Activation message. Upon activation of the SCells, the mobile device may receive data from the base station via a first component carrier, and may receive data from a second base station (e.g., an SCell) via a second component carrier (e.g., a component carrier that is different from the first component carrier). It is noted that aspects of embodiments may support CA operations of a mobile device with any number of component carriers (currently limited to 32 in LTE Advanced Release-13).

As shown above, aspects of the signaling 500 illustrated in FIG. 5 provide improved performance for wireless communication systems. In particular, the signaling 500 enables a base station to quickly configure SCells by reducing latency associated with obtaining information associated with signals by a mobile device and reporting that information to a base station during a transition of the mobile device from an RRC_Suspended State to an RRC_Connected Mode State. Thus, various aspects of the signaling 500 provide improvements to wireless communication systems.

Figure 6:
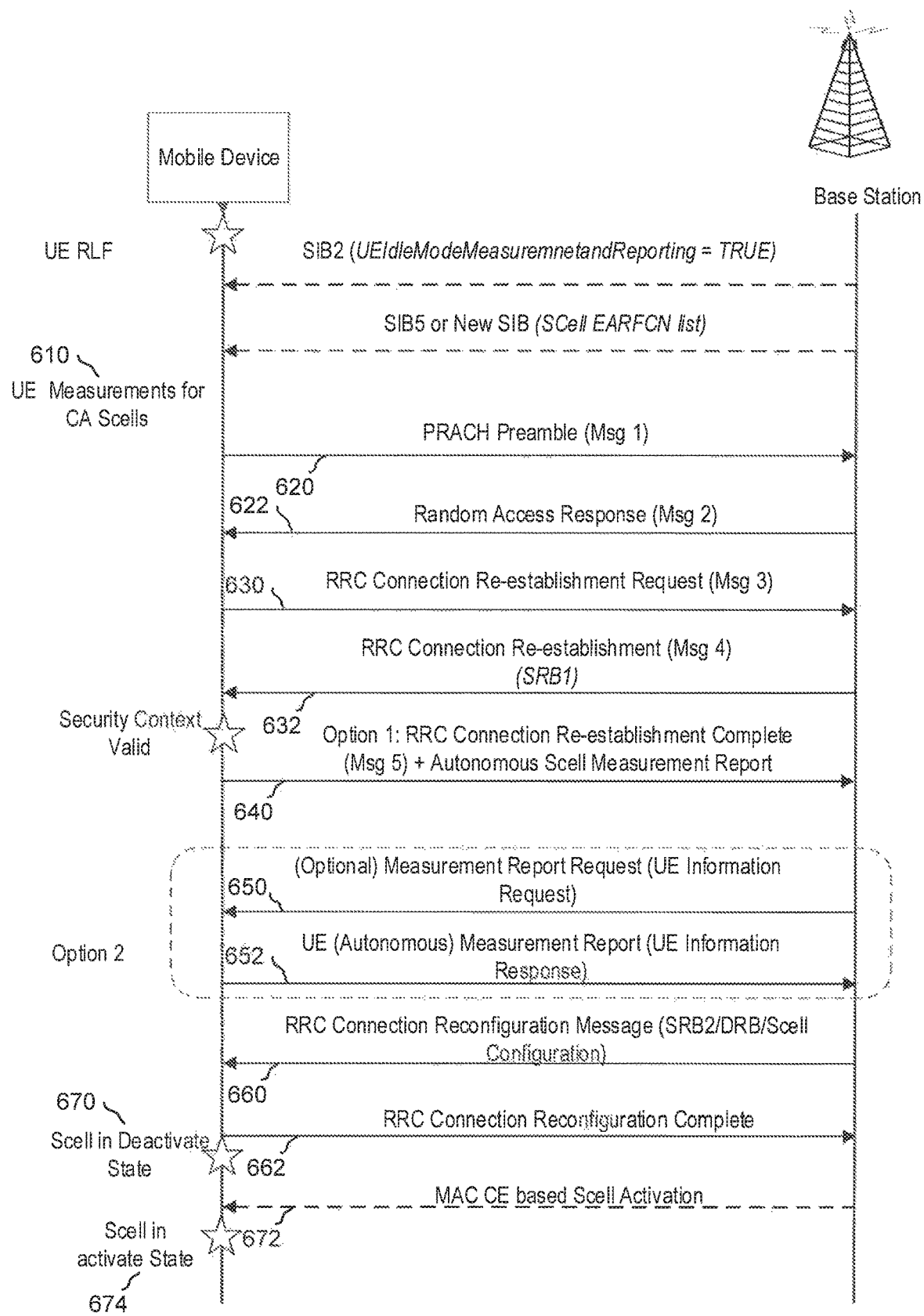
FIG. 6 is a ladder diagram illustrating aspects of signaling that may be exchanged during a transition of a mobile device from a radio link failure (RLF) state and/or an RLF recovery state to an RRC_Connected State in accordance with aspects of the present disclosure.

Referring to FIG. 6, a ladder diagram illustrating aspects of signaling that may be exchanged during a transition of a mobile device from an radio link failure (RLF) state to an RRC_Connected State in accordance with aspects of the present disclosure is shown as signaling 600. As described below, In an aspect, the signaling 600 illustrated in FIG. 6 may be exchanged between a mobile device (e.g., the UE 115 of FIGS. 1 and 2) and a base station (e.g., the base station 105 of FIGS. 1 and 2) to transition of a mobile device to an RRC_Connected Mode State after the mobile device enters an RLF state using an RLF recovery procedure in accordance with aspects of the present disclosure.

In an aspect, the mobile device illustrated in FIG. 6 is initially operating in an RLF State. When the mobile device is in the RLF State, information associated with an active security context (e.g., the security context established during setup of the connection that is being suspended) and a Resume Identity (e.g., resumeIdentity) may be known to (or stored by) the mobile device. Once in the RLF State, the connection may be resumed, using a connection reestablishment operation, as described in more detail below.

In an aspect, while in the RLF State, the mobile device may obtain information associated with signals transmitted by a plurality of base stations, as indicated at 610. In an aspect, the information associated with the signals may include one or more measurements corresponding to each of the signals. The one or more measurements may indicate a signal quality, such as reference signal receive power (RSRP), reference signal receive quality (RSRQ), a signal-to-noise-ratio, etc., for each of the monitored signals, and/or other characteristics of the monitored signals. In an aspect, at least a portion of the information associated with the signals may be autonomously obtained and/or reported by the mobile device without receiving a UE measurement report request (e.g., a UE Information Request) from the base station. In an aspect, the UE measurement report request may be included in an RRC Measurement Report Request. In an aspect, the UE measurement report request may be included in a MAC-CE message, such as an uplink grant for measurement reporting by the mobile device. As described in more detail below, the signals monitored by the mobile device may include carrier frequencies (also referred to herein as component carriers) associated with signals transmitted by a plurality of base stations (e.g., a PCell and one or more SCells).

In an aspect, the mobile device may transmit information that indicates a capability of the mobile device to autonomously obtain the information associated with the signals to the base station. In an aspect, this capability information may be transmitted to the base station prior to transmission of a connection establishment message and/or prior to the mobile device entering the RLF State. In additional or alternative aspects, the information that indicates the capability of the mobile device may be included in a connection establishment message transmitted to the base station. In still another aspect, information that indicates the capabilities (e.g., autonomous measurements, CA capabilities, and the like) of the mobile device may be stored in a database accessible to the base station, and the base station may determine the capabilities of the mobile device without receiving capability information via an exchange of signaling or messages with the mobile device.

In FIG. 6, the base station, which may be a PCell with respect to the mobile device, may broadcast various system information blocks (SIBs) that may be received by mobile devices operating within a coverage area of the base station. One or more of the SIBs broadcast by the base station may include information that identifies one or more carrier frequencies supported by the base station and/or one or more carrier frequencies supported by one or more SCells. In an aspect, the information that identifies one or more carrier frequencies supported by the base station may be included in a first SIB, and the information that identifies one or more carrier frequencies supported by the one or more SCells may be included in a second SIB. In additional or alternative aspects, the information that identifies one or more carrier frequencies supported by the base station and the information that identifies one or more carrier frequencies supported by the one or more SCells may be included in a single SIB. In an aspect, the mobile device may monitor one or more of the SIBs broadcast by the base station to determine the signals that the mobile device is to monitor while operating in the RLF State. In an aspect, the information that identifies the one or more carrier frequencies may be included in one or more existing SIBs, such as SIB 2 or SIB5, as shown in FIG. 6. In additional or alternative aspects, a new SIB may be used to facilitate aspects of embodiments of the present application. When the mobile device includes capabilities to operate in a CA mode, the monitored signals may be determined based on the capability of the mobile device and the supported CA Band Combinations of the mobile device based on the SIB information.

After entering the RLF State, the mobile device may initiate operations to reestablish the connection between the mobile device and the base station. In an aspect, as shown in FIG. 6, at step 620, to reestablish the connection, the mobile device may transmit a message to the base station to signal that the mobile device is attempting to recover from the RLF State and transition to an RRC_Connected State. In an aspect, this message may be transmitted using a physical random access channel (PRACH) message. In an aspect, the mobile device may also monitor the signals during a random access channel (RACH) procedure, where, for example, the mobile device utilizes the waiting time as an opportunity to perform measurements on SCells while waiting for next PRACH occasion (e.g., when attempting to transmit the message at step 620). This may be beneficial as the measurements would be obtained just prior to the mobile device initiating operations to the connection, which would cause the measurement report to contain fresh (i.e., non-stale) information. As shown at step 622, the base station may respond to the message by transmitting a response message to the mobile station. In an aspect, the response message may be a Random Access Response message.

After receiving the response message from the base station, the mobile device may transmit a connection establishment message to the base station, as step 630. In an aspect, the connection establishment message may be an RRC Connection Reestablishment Request message. As described in more detail below, the connection establishment signaling messages may include information that indicates whether the mobile device has information associated with signals transmitted by one or more base stations of the plurality of base stations. This may indicate to the base station that the mobile device has already obtained information associated with the signals that the mobile device has been monitoring while in the connection between the mobile device and the base station was suspended, which may enable the mobile device to provide those measurements to the base station earlier in the signaling exchange than the technique described above with respect to FIG. 3, as described in more detail below. In an aspect, one of the SIBs broadcast by the base station may include information that indicates whether the base station supports early transmission of measurement reports by mobile device, and the information included in the connection establishment message that indicates whether the mobile device has information associated with signals transmitted by one or more base stations of the plurality of base stations may only be included when the SIB indicates that the base station support early transmission of the measurement reports. If the base station does not support early transmission of the measurement reports, the mobile device may not obtain measurements while the connection between the mobile device and the base station was suspended, and may report the measurements to the base station in accordance with the techniques described above with reference to FIG. 3. This may ensure that the reported measurements are not stale.

Subsequent to transmitting the connection establishment message, the mobile device may receive, at step 632, a connection reestablishment message from the base station. In an aspect, the connection reestablishment message may be an RRC Connection Reestablishment message. As explained above, because the mobile device has information associated with the security context of the failed connection, the connection may be activated (e.g., established) after the mobile device receives the connection resume message from the base station. Thus, unlike the signaling 400 illustrated in FIG. 4, the signaling 600 illustrated in FIG. 6 does not require signaling of security context information between the mobile device and the base station. However, it is noted that if the security context is determined to be invalid by the mobile device, the mobile device may enter an RRC_Idle and may initiate operations to establish a connection to the base station using the signaling 400 described above.

As shown at step 640, the mobile device may transmit a connection reestablishment complete message to the base station. In an aspect, the connection reestablishment complete message may be an RRC Connection Reestablishment Complete message. In an aspect, because the security context for the connection has already been established (e.g., based on the security context established prior to failure of the connection), the mobile device may include the information associated with the signals monitored by the mobile device while in the RLF State in the connection reestablishment complete message transmitted to the base station (e.g., in message 5 at step 640). In an aspect, this information may be transmitted without receiving, from the base station at the mobile device, a UE measurement report request message (e.g., a UE Information Request message requesting that the mobile device monitor signals associated with one or more other base stations and provide, to the base station, information associated with the monitored signals). In an aspect, the information associated with the signals may include one or more timestamps, and each of the one or more timestamps may correspond to a time when information associated with a particular one of the signals was obtained by the mobile device. This may enable the base station to determine whether the measurements included in the information associated with the signals received from the mobile device is stale.

In an aspect, if the base station determines that one or more of the measurements included in the information associated with the signals received from the mobile device is stale, the base station may request updated measurements from the mobile device. For example, as indicated at step 650, the base station may transmit a UE measurement report request message to the mobile device, instructing the mobile device to obtain updated measurements for the one or more stale measurements previously reported by the mobile device. In an aspect, the UE measurement report request message may be an RRC Measurement Report Request (e.g., a UE Information Request). In an aspect, the UE measurement report request message may be included in a MAC-CE signaling message that includes an uplink grant for measurement reporting by the mobile device, and the mobile device may obtain the updated measurements and transmit them to the base station in accordance with the uplink grant, as indicated at step 652.

In an alternative aspect, rather than include the information associated with the signals in the connection reestablishment message (e.g., at step 640), the mobile device may wait until a UE measurement report request message (e.g., a UE Information Request) is received from the base station, at step 650, and may transmit the information associated with the signals (e.g., in a UE Information Response) in response to receiving the UE measurement report request message, at step 652. It is noted that in this alternative aspect, the base station may be able to request the measurement reports sooner because the mobile device has previously signaled to the base station whether the mobile device has already obtained the information associated with the signals (e.g., in message 5 at step 640 and at step 630).

After receiving the measurement report from the mobile device, at step 640, at step 652, or both steps 640 and 652, the base station may determine one or more SCells for supporting a CA capability of the mobile device, and transmit, at step 660, a connection configuration message to the mobile device. The connection configuration message may include one or more parameters for configuring a CA mode of the mobile device. For example, the one or more parameters may identify one or more SCells that are to be activated for supporting the CA mode of the mobile device. In an aspect, the connection configuration message may be an RRC Connection Reconfiguration message. In response to receiving the connection configuration message, the mobile device may configure the CA mode based on the information included in the connection configuration message, and may transmit a connection configuration complete message to the base station to indicate that the CA mode has been configured by the mobile device, at step 662. In an aspect, the connection configuration complete message may be an RRC Connection Reconfiguration Complete message.

As shown at step 670, at the time the mobile device transmits the connection configuration complete message, the one or more SCells may remain in a deactivated state (e.g., not activated to facilitate CA transmission of data to the mobile device). At step 672, the base station may transmit an SCell Activation message, which may activate the one or more SCells, as indicated at step 674. In an aspect, the SCell Activation message may be a MAC-CE-based SCell Activation message. Upon activation of the SCells, the mobile device may receive data from the base station via a first component carrier, and may receive data from a second base station (e.g., an SCell) via a second component carrier (e.g., a component carrier that is different from the first component carrier). It is noted that aspects of embodiments may support CA operations of a mobile device with any number of component carriers (currently limited to 32 in LTE Advanced Release-13).

As shown above, aspects of the signaling 600 illustrated in FIG. 6 provide improved performance for wireless communication systems. In particular, the signaling 600 enables a base station to quickly configure SCells by reducing latency associated with obtaining information associated with signals by a mobile device and reporting that information to a base station during a transition of the mobile device to an RRC_Connected Mode State following an RLF. Thus, various aspects of the signaling 600 provide improvements to wireless communication systems.

Figures 7, 8:
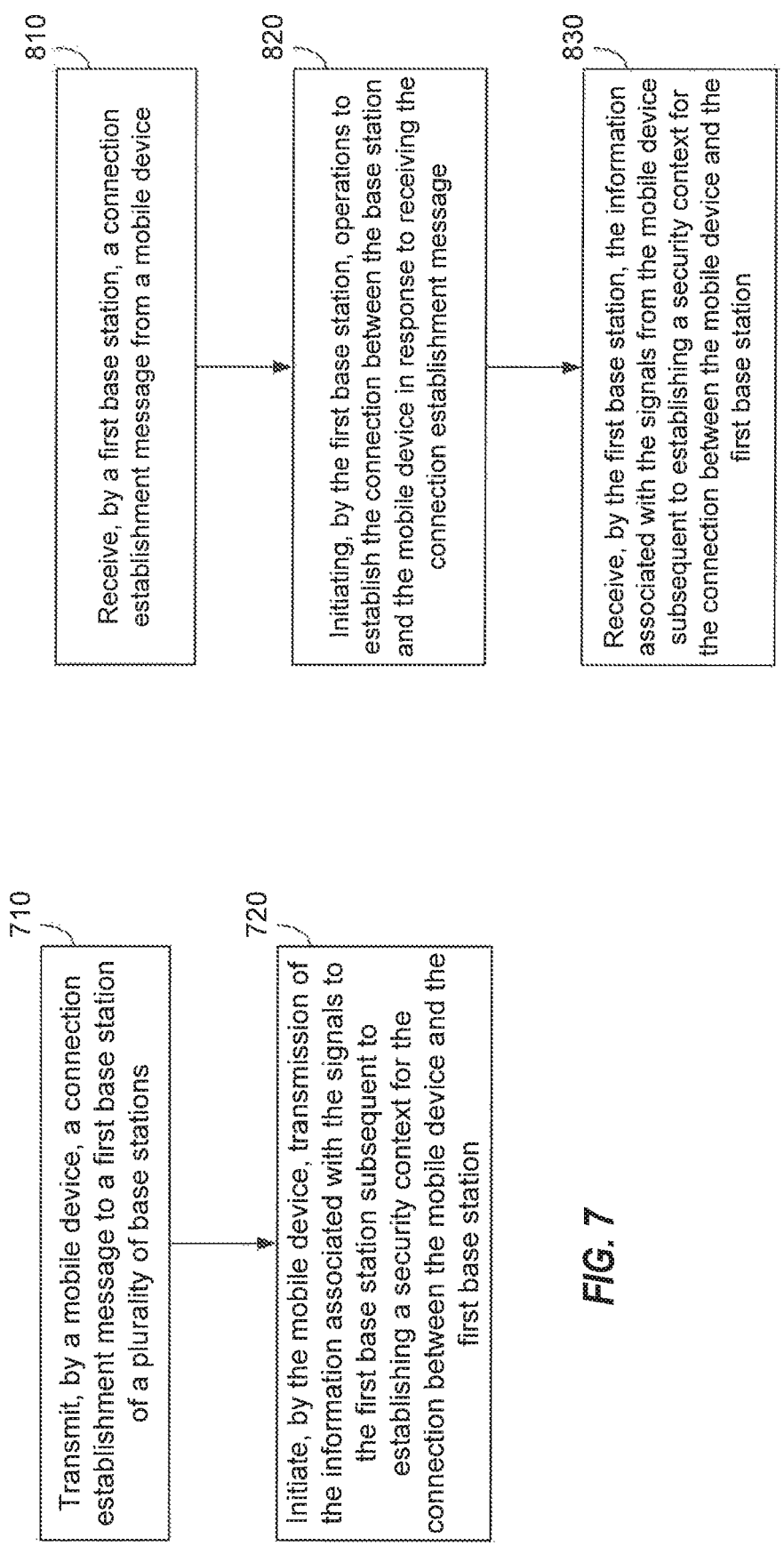
FIG. 7 is a flow diagram of a method for transitioning a mobile device to an RRC_Connected State in accordance with aspects of the present disclosure.
FIG. 8 is another flow diagram of a method for transitioning a mobile device to an RRC_Connected State in accordance with aspects of the present disclosure.

Referring to FIG. 7, a flow diagram of a method for transitioning a mobile device to an RRC_Connected State in accordance with aspects of the present disclosure, is shown as a method 700. In an aspect, the method 700 may be performed by a mobile device, such as the mobile device 115 of FIGS. 1 and 2. In an aspect, the steps of the method 700 may be stored as instructions that, when executed by one or more processors, cause the one or more processors to perform operations of the method 700 described in more detail below.

At step 710, the method 700 includes transmitting, by a mobile device, a connection establishment message to a first base station of a plurality of base stations. In an aspect, the connection establishment message may be the connection establishment message described above with reference to FIG. 4 (e.g., when the mobile device is operating in an RRC_Idle Mode State). In an aspect, the connection establishment message may be the connection establishment message described above with reference to FIG. 5 (e.g., when the mobile device is operating in an RRC_Suspended Mode State). In an aspect, the connection establishment message may be the connection establishment message described above with reference to FIG. 6 (e.g., when the mobile device is operating in an RLF State and/or implementing an RLF Recovery Procedure). As explained above with reference to FIGS. 4-6, the connection establishment message may include information that indicates whether the mobile device has information associated with signals transmitted by one or more base stations of the plurality of base stations. In an aspect, the information associated with signals transmitted by one or more base stations of the plurality of base stations may be obtained autonomously by the mobile device. It is noted that depending on the state that the mobile device is operating in (e.g., the RRC_Idle Mode State, the RRC_Suspended State, the RLF and/or the RLF Recovery Procedure State), different operations to establish a security context for the connection between the mobile device and the base station may be utilized, as described above with reference to FIGS. 4-6.

At step 720, the method 700 includes initiating, by the mobile device, transmission of the information associated with the signals to the first base station subsequent to establishing a security context for the connection between the mobile device and the first base station. In an aspect, the transmission of the information may be performed using one or more of the various techniques described above with reference to FIGS. 4-6. It is noted that the particular techniques utilized to establish the connection and/or transmit the information associated with the signals transmitted by one or more base stations of the plurality of base stations may vary depending on the state that the mobile device is operating in (e.g., the RRC_Idle Mode State, the RRC_Suspended State, the RLF and/or the RLF Recovery Procedure State), as described above with reference to FIGS. 4-6.

Referring to FIG. 8, another flow diagram of a method for transitioning a mobile device to an RRC_Connected State in accordance with aspects of the present disclosure is shown as a method 800. In an aspect, the method 800 may be performed by a mobile device, such as the base station 105 of FIGS. 1 and 2, that is operating as a PCell with respect to a mobile device. In an aspect, the steps of the method 800 may be stored as instructions that, when executed by one or more processors, cause the one or more processors to perform operations of the method 800 described in more detail below.

At step 810, the method 800 includes receiving, by a first base station, a connection establishment message from a mobile device. In an aspect, the connection establishment message may include information that indicates whether the mobile device has information associated with signals transmitted by one or more base stations of a plurality of base stations. In an aspect, the plurality of base stations may include the first base station, which may act as a primary cell for the mobile device, and one or more additional base stations. In an aspect, the one or more additional base stations may utilized as SCells to support CA functionality of the mobile device.

At step 820, the method 800 includes initiating, by the first base station, operations to establish the connection between the base station and the mobile device in response to receiving the connection establishment message. It is noted that the particular techniques utilized to establish the connection and/or transmit the information associated with the signals transmitted by one or more base stations of the plurality of base stations may vary depending on the state that the mobile device is operating in (e.g., the RRC_Idle Mode State, the RRC_Suspended State, the RLF and/or the RLF Recovery Procedure State), as described above with reference to FIGS. 4-6.

At step 830, the method 800 may include receiving, by the first base station, the information associated with the signals from the mobile device subsequent to establishing a security context for the connection between the mobile device and the first base station. In an aspect, the security context may establish in various ways depending on the state that the mobile device is operating in (e.g., the RRC_Idle Mode State, the RRC_Suspended State, the RLF and/or the RLF Recovery Procedure State), as described above with reference to FIGS. 4-6. In response to receiving the information associated with the signals from the mobile device, the base station may determine one or more SCells to support a CA functionality of the mobile, and may initiate operations to configure the mobile device to operate in a CA mode and to activate one or more SCells to support operation of the mobile device in CA mode. In an aspect, the base station may analyze the information associated with the signals to determine whether one or more measurement included therein are stale, and, if any stale measurements are identified, the base station may implement operations to obtain updated information associated with one or more of the signals from the mobile device, as described above with reference to FIGS. 4-6.

Figures 9, 10:
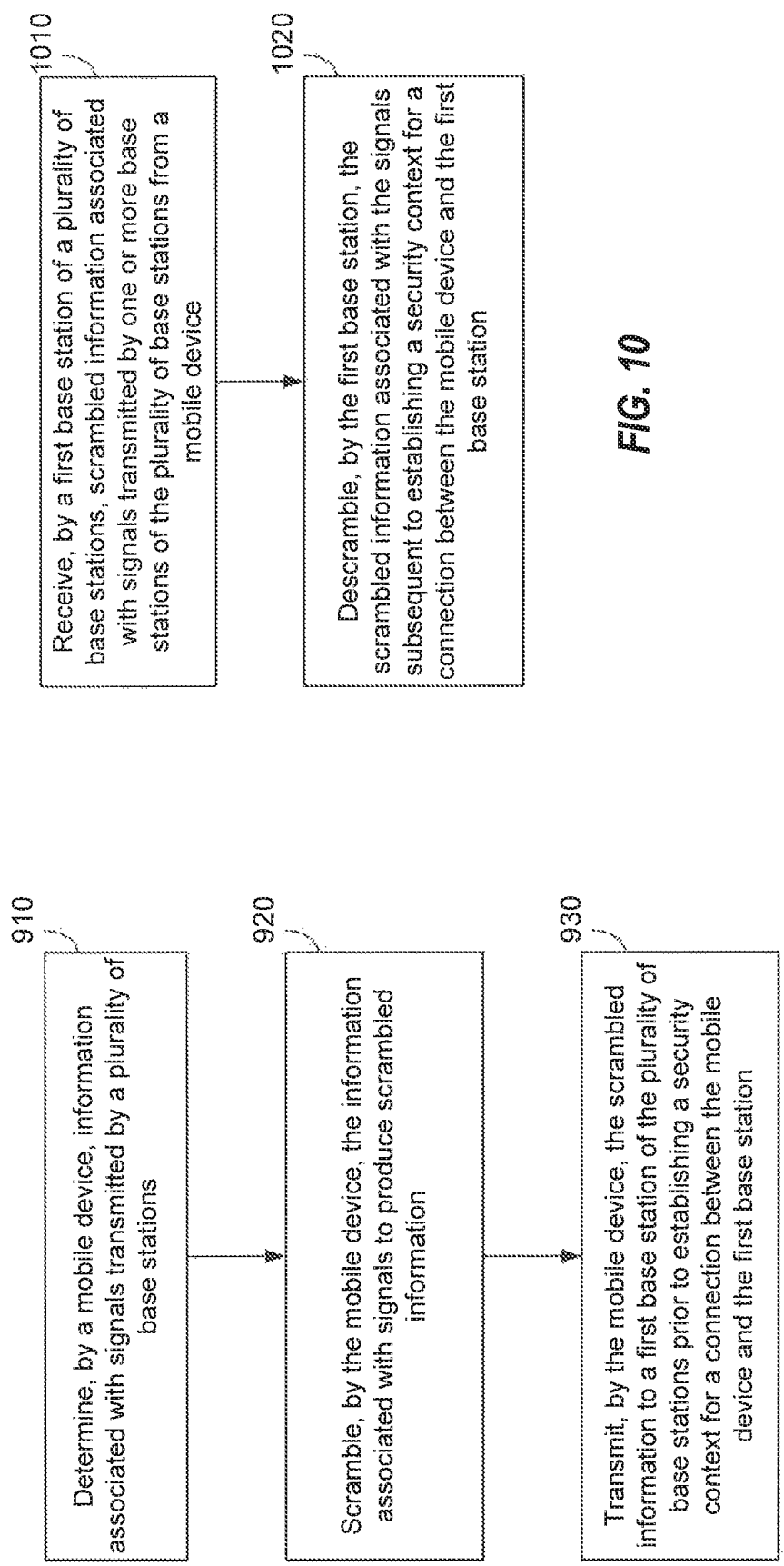
FIG. 9 is a flow diagram of another method for transitioning a mobile device to an RRC_Connected State in accordance with aspects of the present disclosure.
FIG. 10 is flow diagram of another method for transitioning a mobile device to an RRC_Connected State in accordance with aspects of the present disclosure.

Referring to FIG. 9, a flow diagram of another method for transitioning a mobile device to an RRC_Connected State in accordance with aspects of the present disclosure is shown as a method 900. In an aspect, the method 900 may be performed by a mobile device, such as the mobile device 115 of FIGS. 1 and 2. In an aspect, the steps of the method 900 may be stored as instructions that, when executed by one or more processors, cause the one or more processors to perform operations of the method 900 described in more detail below.

At step 910, the method 900 includes determining, by a mobile device, information associated with signals transmitted by a plurality of base stations. In an aspect, the information associated with the signals transmitted by the plurality of base stations may be the information described above with respect to FIGS. 4-6. In an aspect, the information associated with the signals may include one or more measurements corresponding to each of the signals. In an aspect, the measurement report(s) may contain information that identifies one or more SCells from which the mobile device was able to receive signals, characteristics of those signals (e.g., signal strength, signal-to-noise-ratio (SNR), and the like), memory buffer data, channel conditions, other types of information, or a combination thereof. In an aspect, step 910 may be performed by the mobile device while operating in any of the operational states described above with respect to FIGS. 4-6. For example, the mobile device may autonomously determine at least a portion of the measurements while the mobile device is operating in an idle mode, as described above with reference to FIG. 4, in a suspended mode, as described above with reference to FIG. 5, or in an RLF and/or RLF recovery mode, as described above with reference to FIG. 6.

At step 920, the method 900 includes scrambling, by the mobile device, the information associated with the signals to produce scrambled information. In an aspect, the information associated with the signals may be scrambled by the mobile device using a key (e.g., a scrambling key). In an aspect, the key may be received from a first base station, such as a base station serving as a PCell with respect to the mobile device. In an aspect, the key used by the mobile device to perform the scrambling is not derived or generated for use as part of an AS security context (e.g., a security context for a connection between the mobile device and the first base station during a transition of the mobile device to an RRC_Connected State), which may be established using the security signaling described above with reference to FIG. 4 (e.g., at steps 440 and 442). As one example, the key may be a non-access stratum (NAS) key generated by the base station, and transmitted to the mobile device using NAS signaling. In an aspect, the key may be a pre-determined key. In an aspect, the key may be dynamically generated by the base station. It is noted that the particular types of signaling described above to indicate the key to the mobile device are provided for purposes of illustration, rather than by way of limitation, and that other types of signaling may be used in accordance with embodiments of the present disclosure. Further, in some aspects, no signaling may be required between the mobile device and the base station with respect to the key used to perform the scrambling by the mobile device, such as when a pre-determined key is used.

At step 930, the method 900 includes transmitting, by the mobile device, the scrambled information to the base station prior to establishing a security context for a connection between the mobile device and the first base station. In contrast to the techniques described above with respect to FIGS. 4-8 above, the method 900 may enable the information associated with the signals detected/monitored by the mobile device to be provided to the base station more quickly (e.g., because the information may be provided prior to establishing the security context for the connection between the mobile device and the base station). In an aspect, the base station may descramble the information once the security context for the connection between base station and the mobile device is established (e.g., either based on security context signaling, as described above with reference to FIG. 4, or based on a prior security context established for the connection between the base station and the mobile device, as described above with reference to FIGS. 5 and 6).

As explained above, the information associated with the signal may include timestamps, which may be used by the base station to determine whether any measurements included in the information associated with the signals are stale. In an aspect, if the base station determines that one or more of the measurements are stale, the base station may transmit a UE measurement report request to the mobile device, and, in response to receiving the UE measurement report request, the mobile device may determine updated information for the signals determined to be associated with stale information, and transmit the updated information to the base station. In an aspect, the UE measurement report request may include an uplink grant for reporting the updated information by the mobile device, and the mobile device may transmit the updated information to the base station in accordance with the uplink grant.

As explained above, In an aspect, the mobile device may monitor one or more system information blocks (SIBs) broadcast by the first base station, the one or more SIBs including information that indicates whether the mobile device is to determine the information associated with the signals autonomously, which signals the mobile device should monitor, the types of information to be included in the measurement reports, and the like. In an aspect, after the base station descrambles the information associated with the signals, the base station may determine a CA configuration for the mobile device, as described above with reference to FIGS. 4-8, and may transmit a connection configuration message to the mobile device. Upon receiving the connection configuration message from the base station, the mobile device may configure a CA mode of the mobile device, which may enable the mobile device to receive data from the first base station via a first component carrier, and to receive data from a second base station via a second component carrier, as described above with reference to FIGS. 4-8.

As shown above, aspects of the method 900 enable a mobile device to autonomously determine information associated with signals transmitted by a plurality of base stations while operating in a non-connected mode, such as an RRC_Idle Mode State, an RRC_Suspended Mode State, an RLF State, and/or RLF Recovery Procedure State, and then transmit a scrambled version of the information associated with the signals to the base station serving as a PCell for the mobile device prior to establishing a security context for a connection between the mobile device and the base station. Further, as explained above, the key used to scramble the information associated with the signals may be determined and/or generated independent of, and prior to, establishing the security context established for the connection between the mobile device and the base station. That is to say that the scrambling key may be a NAS key or another type of key that is generated independent of any keys determined and/or generated during establishment of an AS security context for the connection between the mobile device and the base station. In comparison to the techniques described above with respect to FIGS. 4-8, the method 900 may enable the information associated with the signals monitored by the mobile device to be provided to the base station earlier in the signaling process (e.g., prior to establishing a security context for the connection between the base station and the mobile device).

It is noted that the method 900 may be implemented as an alternative to, or in addition to, the method 700 and the operations described above with reference to FIGS. 4-8. For example, as explained above, the base station may broadcast information that indicates whether the mobile device is to autonomously monitor signals and obtain measurements. In an aspect of the method 900, this information may further indicate whether the mobile device should report the measurements in accordance with the method 700 or the method 900 (e.g., some base stations may be configured to support the method 700, other base stations may be configured to support the method 900, and still other base stations may support both the method 700 and the method 900 and may selectively configure mobile devices to use the method 700 or the method 900).

It is also noted that, depending on the state (e.g., idle, suspended, RLF and/or RLF recovery) of the mobile device, various aspects of the signaling exchanged between the mobile device and the base station described above with reference to FIGS. 4-8 may be implemented in the method 900 to facilitate a transition of the mobile device to a connected state (e.g., an RRC_Connected State). However, the method 900 differs from the techniques described with reference to FIGS. 4-8 in the sense that the mobile device uses a key determined and/or generated independent of establishing an AS security context for a connection between the base station and the mobile device to scramble the information associated with the monitored signals, and then transmits the scrambled information to the base station, and in the sense that transmission of the scrambled information from the mobile device to the base station may occur prior to establishing a security context for the connection between the mobile device and the base station. By providing the information to the first base station earlier in the process of establishing the connection between the first base station and the mobile device, the first base station may be able to determine the CA configuration for the mobile device more quickly, reducing the latency associated with current processes.

Referring to FIG. 10, a flow diagram of another method for transitioning a mobile device to an RRC_Connected State in accordance with aspects of the present disclosure is shown as a method 1000. In an aspect, the method 1000 may be performed by a base station, such as the base station 105 of FIGS. 1 and 2, that is operating as a PCell with respect to a mobile device. In an aspect, the steps of the method 1000 may be stored as instructions that, when executed by one or more processors, cause the one or more processors to perform operations of the method 1000 described in more detail below.

At a step 1010, the method 1000 includes receiving, by a first base station of a plurality of base stations, scrambled information associated with signals transmitted by one or more base stations of the plurality of base stations from a mobile device. In an aspect, the scrambled information may be the scrambled information described above with reference to FIG. 9. As described above, In an aspect, the scrambled information may include information associated with a plurality of signals monitored by the mobile device while operating in a non-connected state, such as an RRC_Idle Mode State, an RRC_Suspended Mode State, an RLF State and/or an RLF Recovery Procedure State, and may be received by the first base station prior to establishing a security context for the connection between the base station and the mobile device. In an aspect, the key used by the mobile device to perform the scrambling is not derived or generated for use as part of an AS security context (e.g., a security context for a connection between the mobile device and the first base station during a transition of the mobile device to an RRC_Connected State), which may be established using the security signaling described above with reference to FIG. 4 (e.g., at steps 440 and 442). As one example, the key may be a NAS key transmitted from the base station to the mobile device using NAS signaling.

At step 1020, the method 1000 includes descrambling, by the first base station, the scrambled information associated with the signals subsequent to establishing a security context for a connection between the mobile device and the first base station. As explained above with respect to FIG. 9, although the first base station may receive the scrambled information prior to establishing the security context, the first base station may delay descrambling of the information until after the security context for the connection between the first base station and the mobile device is established. Additionally, as explained above with respect to FIG. 9, the security context may be established in different ways depending on the state of the mobile device (e.g., whether the mobile device is operating the RRC_Idle Mode State, the RRC_Suspended Mode State, the RLF State and/or the RLF Recovery Procedure State), as described above with reference to FIGS. 4-9.

In an aspect, the scrambled information associated with the signals may be received from the mobile device prior to transmission of an uplink grant from the first base station to the mobile device, as described above with reference to FIG. 9. For example, In an aspect, the scrambled information associated with the signals may include one or more timestamps, each of the one or more timestamps corresponding to a time when information associated with a particular one of the signals was obtained by the mobile device. The first base station may determine whether descrambled information associated with one or more of the signals is stale based on the timestamps, and may transmit a UE measurement report request to the mobile device when at least a portion of the descrambled information is stale. The UE measurement report request may instruct the mobile device to provide updated information for signals determined to be associated with stale information, and may include an uplink grant that the mobile device may use to transmit the updated information to the first base station.

In an aspect, the method 1000 may include determining, by the first base station, a carrier aggregation configuration for the mobile device based at least in part on the information associated with the signals, as described above with reference to FIGS. 4-9, and transmitting, by the first base station, a connection configuration message to the mobile device. The connection configuration message may identify the determined carrier aggregation configuration for the mobile device, and may be used by the mobile device to configure the mobile device to receive data from the first base station via a first component carrier, and to receive data from a second base station via a second component carrier, as described above with reference to FIGS. 4-9.

As shown above, aspects of the method 1000 enable a first base station to provide a scrambling key to a mobile device prior to establishing an AS security context for a connection between the first base station and the mobile device and then receive scrambled information associated with associated with signals transmitted by a plurality of base stations from a mobile device while the mobile device is operating in a non-connected mode, such as an RRC_Idle Mode State, an RRC_Suspended Mode State, an RLF State, and/or RLF Recovery Procedure State. The first base station may descramble the scrambled information after establishing a security context (e.g., an AS security context) for a connection between the mobile device and the first base station. In comparison to the techniques described above with respect to FIGS. 4-8, the method 1000 may enable the information associated with the signals monitored by the mobile device to be received by the base station earlier in the signaling process (e.g., prior to establishing a security context for the connection between the base station and the mobile device).

It is noted that the method 1000 may be implemented as an alternative to, or in addition to, the method 800 and the operations described above with reference to FIGS. 4-8. For example, as explained above, the first base station may broadcast information (e.g., via one or more SIBs) that indicates whether the mobile device is to autonomously monitor signals and obtain measurements. In an aspect of the method 1000, this information may further indicate whether the mobile device should report the measurements in accordance with the method 700 or the method 900 (e.g., some base stations may be configured to support the method 700, other base stations may be configured to support the method 900, and still other base stations may support both the method 700 and the method 900 and may selectively configure mobile devices to use the method 700 or the method 900).

It is also noted that, depending on the state (e.g., idle, suspended, RLF and/or RLF recovery) of the mobile device, various aspects of the signaling exchanged between the mobile device and the base station described above with reference to FIGS. 4-8 may be implemented in the method 1000 to facilitate a transition of the mobile device to a connected state (e.g., an RRC_Connected State). However, the method 1000 differs from the techniques described with reference to FIGS. 4-8 in the sense that the mobile device scrambles the information associated with the monitored signals to produce scrambled information, and then transmits the scrambled information to the first base station, and in the sense that transmission of the scrambled information from the mobile device to the first base station may occur prior to establishing a security context for the connection between the mobile device and the base station. By providing the information to the first base station earlier in the process of establishing the connection between the first base station and the mobile device, the first base station may be able to determine the CA configuration for the mobile device more quickly, reducing the latency associated with current processes. As shown above, the present disclosure provides various signaling message flows between a base station and a mobile device for establishing a connection (or reconnection) between the base station and the mobile device. Additionally, as disclosed above, the set of signaling flow messages may include at least one message of the set of connection establishing signaling messages includes information that indicates whether the mobile device has information associated with signals transmitted by one or more base stations of the plurality of base stations Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4-9 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    monitoring, by a mobile device operating in a non-connected state, a system information block (SIB) for information that indicates a first base station of a plurality of base stations supports receiving measurement information via radio resource control (RRC) signaling, wherein the SIB is broadcast by the first base station;
    transmitting, by a mobile device, a set of connection establishment signaling messages to a first base station of a plurality of base stations, wherein at least one connection establishment signaling message of the set of connection establishment signaling messages is a RRC signaling message that includes an indication the mobile device has information associated with signals transmitted by one or more base stations of the plurality of base stations, the indication included in the RRC signaling message based on the monitoring; and
    transmitting, by the mobile device, the information associated with the signals to the first base station subsequent to establishing a security context for the connection between the mobile device and the first base station.

2. The method of claim 1, wherein the information associated with the signals comprises one or more measurements corresponding to each of the signals, and wherein the method includes autonomously obtaining, by the mobile device, at least a portion of the measurements while operating in an idle mode.

3. The method of claim 1, wherein the mobile device transmits the information associated with the signals to the first base station based on a measurement request received from the first base station.

4. The method of claim 1, wherein the method includes monitoring, by the mobile device, signaling transmitted by the first base station, wherein the signaling indicates carrier frequencies associated with one of more secondary cells (SCells), and wherein the information associated with the signals includes measurements corresponding to the carrier frequencies indicated by the signaling.

5. The method of claim 4, wherein the information associated with the signals includes measurements corresponding carrier aggregation band combinations corresponding to the carrier frequencies indicated by the signaling and supported by the mobile device.

6. The method of claim 1, wherein the method includes:
    receiving, by the mobile device, a connection configuration message from the first base station subsequent to transmission of the information associated with the signals; and
    configuring, by the mobile device, a carrier aggregation mode of the mobile device based at least in part on the connection configuration message.

7. The method of claim 6, wherein the carrier aggregation mode of the mobile device configures the mobile device to receive data via a first component carrier and a second component carrier.

8. The method of claim 7, wherein the first component carrier is associated with a primary cell (PCell) and the second component carrier is associated with a secondary cell (SCell).

9. The method of claim 8, wherein the PCell is from an evolved Node B (eNB) or a next generation Node B (gNB), and wherein the SCell is from one of a pico cell, a femtocell, the eNB, or the gNB.

10. The method of claim 1, wherein the method includes transmitting information that indicates a capability of the mobile device to autonomously obtain the information associated with the signals to the first base station.

11. The method of claim 10, wherein the information that indicates the capability of the mobile device is transmitted to the first base station prior to transmission of the connection establishment message.

12. The method of claim 1, wherein the security context for the connection between the mobile device and the first base station is established based on a security context of a prior connection between the first base station and the mobile device.

13. The method of claim 12, wherein the method includes receiving, by the mobile device, a connection resume message from the first base station in response to a connection resume request sent by the mobile device to the first base station, wherein the information that indicates whether the mobile device has the information associated with the signals is transmitted in response to receiving the connection resume message.

14. The method of claim 1, wherein the mobile device transmits the information associated with the signals to the first base station using a user equipment (UE) Information Response message.

15. The method of claim 1, wherein the method includes receiving, by the mobile device, information that identifies a configuration of one or more secondary cells (SCells) from the first base station, and wherein the information associated with the signals comprises measurements associated with at least one of the one or more SCells.

16. The method of claim 1, wherein the information associated with the signals comprises one or more timestamps, each of the one or more timestamps corresponding to a time when information associated with a particular one of the signals was obtained by the mobile device.

17. The method of claim 1, wherein the method includes receiving, by the mobile device during the monitoring, SIB2 signaling from the first base station, wherein the SIB2 signaling includes the information that indicates whether the first base station supports reception of measurements obtained by the mobile device while operating in an idle mode prior to establishing the security context for the connection between the mobile device and the first base station, wherein the mobile device transmits the information that indicates whether the mobile device has the information associated with the signals in a RRC connection setup message when the first base station supports reception of measurements obtained by the mobile device while operating in an idle mode prior to establishing the security context for the connection between the mobile device and the first base station, and wherein the mobile device does not transmits the information that indicates whether the mobile device has the information associated with the signals in the RRC connection setup message when the first base station does not support reception of measurements obtained by the mobile device while operating in the idle mode prior to establishing the security context for the connection between the mobile device and the first base station.

18. An apparatus configured for wireless communication, the apparatus comprising:
  at least one processor; and
  a memory coupled to the at least one processor, wherein the at least one processor is configured to:
    monitor, while in a non-connected state, a system information block (SIB) for information that indicates a first base station of a plurality of base stations supports receiving measurement information via radio resource control (RRC) signaling, wherein the SIB is broadcast by the first base station;
    transmit a set of connection establishment signaling messages to a first base station of a plurality of base stations, wherein at least one of connection establishment message of the set of connection establishment messages is a RRC signaling message that includes information that indicates whether a mobile device has information associated with signals transmitted by one or more base stations of the plurality of base stations, the indication included in the RRC signaling message based on the monitoring; and
    transmit the information associated with the signals to the first base station subsequent to establishing a security context for the connection between the mobile device and the first base station.

19. The apparatus of claim 18, wherein the information associated with the signals is transmitted to the first base station using a user equipment (UE) Information Response message.

20. The apparatus of claim 18, wherein the at least one processor is configured to:
  receive a connection configuration message from the first base station subsequent to transmission of the information associated with the signals; and
  configure a carrier aggregation mode of the mobile device based at least in part on the connection configuration message, wherein the carrier aggregation mode of the mobile device configures the mobile device to receive data via a first component carrier and a second component carrier.

21. The apparatus of claim 20, wherein the first component carrier is associated with a primary cell (PCell) and the second component carrier is associated with a secondary cell (SCell), wherein the PCell is from an evolved Node B (eNB) or a next generation Node B (gNB), and wherein the SCell is from one of a pico cell, a femtocell, the eNB, or the gNB.

22. A method for wireless communication, the method comprising:
  broadcasting, by a first base station of a plurality of base stations, system information block (SIB) information that indicates the first base station of a plurality of base stations supports receiving measurement information via radio resource control (RRC) signaling;
  receiving, by the first base station, a set of connection establishment signaling messages from a mobile device, wherein at least one connection establishment signaling message of the set of connection establishment signaling messages is a RRC signaling message that includes an indication the mobile device has information associated with signals transmitted by one or more base stations of the plurality of base stations, the indication included in the RRC signaling message by the mobile device based on the SIB information;
  initiating, by the first base station, operations to establish the connection between the first base station and the mobile device in response to receiving at least one connection establishment message of the set of connection establishment signaling messages; and
  receiving, by the first base station, the information associated with the signals from the mobile device subsequent to establishing a security context for the connection between the mobile device and the first base station.

23. The method of claim 22, wherein the set of connection establishment signaling messages includes a radio resource control (RRC) Connection Setup Complete message that includes the information that indicates whether the mobile device has the information associated with the signals.

24. The method of claim 22, wherein the set of connection establishment signaling messages includes a radio resource control (RRC) Connection Resume Complete message that includes the information that indicates whether the mobile device has the information associated with the signals, and wherein the method includes:
  transmitting, by the first base station, a user equipment (UE) Information Request to the mobile device in response to receiving the RRC Connection Resume Complete message that includes the information that indicates whether the mobile device has the information associated with the signals; and
  receiving, by the first base station in response to transmission of the UE Information Request, a UE Information Response message that includes the information associated with the signals from the mobile device.

25. The method of claim 22, wherein the information associated with the signals comprises one or more timestamps, each of the one or more timestamps corresponding to a time when information associated with a particular one of the signals was obtained by the mobile device.

26. The method of claim 25, wherein the method includes determining, by the first base station, whether information associated with one or more of the signals is stale based on the timestamps.

27. The method of claim 22, wherein the method includes transmitting, by the first base station, a measurement request to the mobile device in response to a determination that at least a portion of the information associated with one or more of the signals is stale, wherein the measurement request instructs the mobile device to report additional information for at least the one or more signals associated with stale information.

28. The method of claim 22, wherein the method includes:
determining, by the first base station, a carrier aggregation configuration for the mobile device based at least in part on the information associated with the signals; and
transmitting, by the first base station, a connection configuration message to the mobile device to configure a carrier aggregation mode of the mobile device, wherein the connection configuration message includes information that identifies the determined carrier aggregation configuration for the mobile device.

29. The method of claim 28, wherein the information that identifies the determined carrier aggregation configuration for the mobile device configures the mobile device to receive data via a first component carrier and a second component carrier.

30. The method of claim 29, wherein the first component carrier is associated with a primary cell (PCell) and the second component carrier is associated with a secondary cell (SCell).

31. The method of claim 30, wherein the PCell is from an evolved Node B (eNB) or a next generation Node B (gNB), and wherein the SCell is from one of a pico cell, a femtocell, the eNB, or the gNB.

32. The method of claim 22, wherein the method includes transmitting, by the first base station, signaling that indicates carrier frequencies associated with one or more secondary cells (SCells), and wherein the information associated with the signals received from the mobile device includes measurements corresponding to the carrier frequencies indicated by the signaling.

33. The method of claim 32, wherein the signaling comprises system information block (SIB) 5 signaling and/or radio resource control (RRC) signaling.

34. The method of claim 32, wherein the information associated with the signals received from the mobile device includes measurements corresponding supported carrier aggregation band combinations corresponding to the carrier frequencies indicated by the signaling.

35. An apparatus configured for wireless communication, the apparatus comprising:
at least one processor; and
a memory coupled to the at least one processor, wherein the at least one processor is configured to:
broadcast system information block (SIB) information that indicates a first base station of a plurality of base stations supports receiving measurement information via radio resource control (RRC) signaling;
receive a set of connection establishment messages from a mobile device, wherein at least one connection establishment signaling message of the set of connection establishment signaling messages is a RRC signaling message that includes an indication the mobile device has information associated with signals transmitted by one or more base stations of the plurality of base stations, the indication included in the RRC signaling message by the mobile device based on the SIB information;
initiate operations to establish the connection between the first base station and the mobile device in response to receiving at least one connection establishment signaling message of set of the connection establishment message; and
receive the information associated with the signals from the mobile device subsequent to establishing a security context for the connection between the mobile device and the first base station.

36. The apparatus of claim 35, wherein the operations to establish the connection between the first base station and the mobile device includes transmitting a user equipment (UE) Information Request to the mobile device, and wherein the information associated with the signals is received from the mobile device via a UE Information Response message.

37. A method of wireless communication, comprising:
monitoring, by a mobile device, a system information block (SIB) for information that indicates receiving measurement information via radio resource control (RRC) signaling being supported by a first base station of a plurality of base stations;
transmitting, by the mobile device to the first base station of the plurality of base stations in association with transitioning to an RRC connected state, an RRC signaling message that indicates the mobile device has information associated with signals transmitted by one or more base stations of the plurality of base stations, the transmitting the RRC signaling message being based on the SIB; and
transmitting, by the mobile device, the information associated with the signals to the first base station.

38. The method of wireless communication of claim 37, further comprising:
obtaining, by the mobile device in an RRC idle state and based on the SIB, the information associated with the signals.

39. The method of wireless communication of claim 37, further comprising:
obtaining, by the mobile device in an RRC suspended state and based on the SIB, the information associated with the signals, the RRC suspended state comprising suspending an RRC connection.

40. The method of wireless communication of claim 39, further comprising:
transmitting, by the mobile device to the first base station in response to a connection resume message from the first base station, a connection resume complete message incorporating the information associated with the signals.

41. The method of wireless communication of claim 40, further comprising:
obtaining, by the mobile device in an RRC idle state and based on the SIB, the information associated with the signals.

42. An apparatus configured for wireless communication, the apparatus comprising:
at least one processor; and
a memory coupled to the at least one processor,
wherein the at least one processor is configured to:
monitor a system information block (SIB) for information that indicates receiving measurement information via radio resource control (RRC) signaling being supported by a first base station of a plurality of base stations;
transmit, by the mobile device to the first base station of the plurality of base stations in association with transitioning to an RRC connected state, an RRC signaling message that indicates the mobile device has information associated with signals transmitted by one or more base stations of the plurality of base stations, the transmitting the RRC signaling message being based on the SIB; and
transmit, by the mobile device, the information associated with the signals to the first base station.

43. The apparatus of claim 42, further comprising:
obtain, by the mobile device in an RRC idle state and based on the SIB, the information associated with the signals.

44. The apparatus of claim 42, further comprising:
obtain, by the mobile device in an RRC suspended state and based on the SIB, the information associated with the signals, the RRC suspended state comprising suspending an RRC connection.

45. The apparatus of claim 44, further comprising:
transmit, by the mobile device to the first base station in response to a connection resume message from the first base station, a connection resume complete message incorporating the information associated with the signals.

46. The apparatus of claim 45, further comprising:
obtain, by the mobile device in an RRC idle state and based on the SIB, the information associated with the signals.

47. A method of wireless communication, comprising:
broadcasting a system information block (SIB) having information that indicates receiving measurement information via radio resource control (RRC) signaling being supported by a first base station of a plurality of base stations;
receiving, from a mobile device in association with transitioning to an RRC connected state, an RRC signaling message that indicates the mobile device has information associated with signals transmitted by one or more base stations of the plurality of base stations, the RRC signaling message being based on the SIB; and
receiving, from the mobile device, the information associated with the signals.

48. The method of wireless communication of claim 47, the information associated with the signals being based on the mobile device in an RRC idle state and based on the SIB.

49. The method of wireless communication of claim 47, the information associated with the signals being based on the mobile device in an RRC suspended state and based on the SIB, the RRC suspended state comprising suspending an RRC connection.

50. The method of wireless communication of claim 49, further comprising:
receiving, from the mobile device, a connection resume complete message incorporating the information associated with the signals in response to a connection resume message.

51. The method of wireless communication of claim 50, further comprising:
the information associated with the signals being, alternatively, based on the mobile device in an RRC idle state and based on the SIB.

52. An apparatus configured for wireless communication, the apparatus comprising:
at least one processor; and
a memory coupled to the at least one processor,
wherein the at least one processor is configured to:
broadcast a system information block (SIB) having information that indicates receiving measurement information via radio resource control (RRC) signaling being supported by a first base station of a plurality of base stations;
receive, from a mobile device in association with transitioning to an RRC connected state, an RRC signaling message that indicates the mobile device has information associated with signals transmitted by one or more base stations of the plurality of base stations, the RRC signaling message being based on the SIB; and
receive, from the mobile device, the information associated with the signals.

53. The apparatus of claim 52, the information associated with the signals being based on the mobile device in an RRC idle state and based on the SIB.

54. The apparatus of claim 52, the information associated with the signals being based on the mobile device in an RRC suspended state and based on the SIB, the RRC suspended state comprising suspending an RRC connection.

55. The apparatus of claim 54, further comprising:
receive, from the mobile device, a connection resume complete message incorporating the information associated with the signals in response to a connection resume message.

56. The apparatus of claim 55, further comprising:
the information associated with the signals being, alternatively, based on the mobile device in an RRC idle state and based on the SIB.

* * * * *